United States Patent
Jo et al.

(10) Patent No.: US 10,275,202 B2
(45) Date of Patent: Apr. 30, 2019

(54) DISPLAY DEVICE AND COMMAND TRANSMISSION METHOD THEREOF

(71) Applicant: LG Electronics Inc., Seoul (KR)

(72) Inventors: Youngkyu Jo, Seoul (KR); Janghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/550,002

(22) PCT Filed: Nov. 20, 2015

(86) PCT No.: PCT/KR2015/012563
§ 371 (c)(1),
(2) Date: Aug. 9, 2017

(87) PCT Pub. No.: WO2016/129785
PCT Pub. Date: Aug. 18, 2016

(65) Prior Publication Data
US 2018/0046424 A1    Feb. 15, 2018

Related U.S. Application Data

(60) Provisional application No. 62/113,544, filed on Feb. 9, 2015.

(30) Foreign Application Priority Data

Jul. 23, 2015    (KR) .......................... 10-2015-0104599

(51) Int. Cl.
*G06F 3/14*    (2006.01)
*G09G 3/20*    (2006.01)
(Continued)

(52) U.S. Cl.
CPC ......... *G06F 3/1423* (2013.01); *G09G 3/2096* (2013.01); *G09G 5/006* (2013.01);
(Continued)

(58) Field of Classification Search
CPC .... G06F 3/1423; G09G 3/2096; G09G 5/006; G09G 5/12; G09G 5/14; G09G 2310/08;
(Continued)

(56) References Cited

U.S. PATENT DOCUMENTS 4,715,818  A  * 12/1987  Shapiro ................... G09B 5/14
                                                           434/118
2002/0194406 A1* 12/2002  Houlberg ............. G06F 11/349
                                                           710/100

(Continued)

FOREIGN PATENT DOCUMENTS

KR    10-2007-0062630 A    6/2007
KR    10-2009-0063640 A    6/2009
(Continued)

OTHER PUBLICATIONS

PCT International Application No. PCT/KR2015/012563 International Search Report dated Mar. 8, 2015, 4 pages.

*Primary Examiner* — Md Saiful A Siddiqui
(74) *Attorney, Agent, or Firm* — Lee, Hong, Degerman, Kang & Waimey PC

(57) ABSTRACT

A device configuring a multi-display system is disclosed. The device configuring the multi-display system includes a first interface unit providing an access path for access to another device, a second interface unit connected to the first interface unit through a first bus and a second bus, a processor transmitting a first command and receiving a second command, a TX line connecting the processor to 'one of the first bus and the second bus' to transfer the first command, an RX line connecting the processor to 'one of
(Continued)

the first bus and the second bus' to transfer the second command, and a switch unit connecting the RX line and one of the first bus and the second bus, or connecting the TX line and one of the first bus and the second bus, wherein the processor controls the switch unit to respectively connect the RX line to the first bus and the TX line to the second bus or to respectively connect the RX line to the second bus and the TX line to the first bus.

15 Claims, 30 Drawing Sheets

(51) Int. Cl.
*G09G 5/12* (2006.01)
*G09G 5/00* (2006.01)

(52) U.S. Cl.
CPC .......... *G09G 5/12* (2013.01); *G09G 2310/08* (2013.01); *G09G 2320/08* (2013.01); *G09G 2354/00* (2013.01); *G09G 2370/022* (2013.01); *G09G 2380/06* (2013.01)

(58) Field of Classification Search
CPC ......... G09G 2354/00; G09G 2370/022; G09G 2380/06
See application file for complete search history.

(56) References Cited

U.S. PATENT DOCUMENTS

| | | | | |
|---|---|---|---|---|
| 2003/0069891 | A1* | 4/2003 | McClintock | G06F 1/1601 |
| 2004/0155979 | A1 | 8/2004 | Arai et al. | |
| 2006/0238526 | A1* | 10/2006 | Kim | G09G 5/006 |
| | | | | 345/204 |
| 2012/0162351 | A1* | 6/2012 | Feldman | G06Q 30/02 |
| | | | | 348/14.03 |
| 2015/0287390 | A1* | 10/2015 | Kakeko | H04L 61/2038 |
| | | | | 345/1.1 |
| 2017/0308498 | A1* | 10/2017 | Chen | G06F 13/385 |

FOREIGN PATENT DOCUMENTS

| | | |
|---|---|---|
| KR | 10-2013-0099505 A | 9/2013 |
| WO | 2012/091191 A1 | 7/2012 |

* cited by examiner

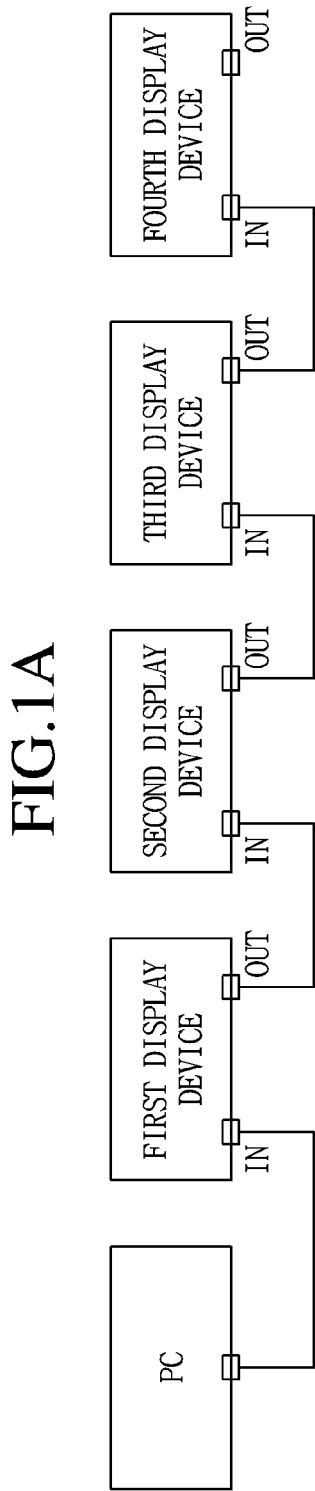

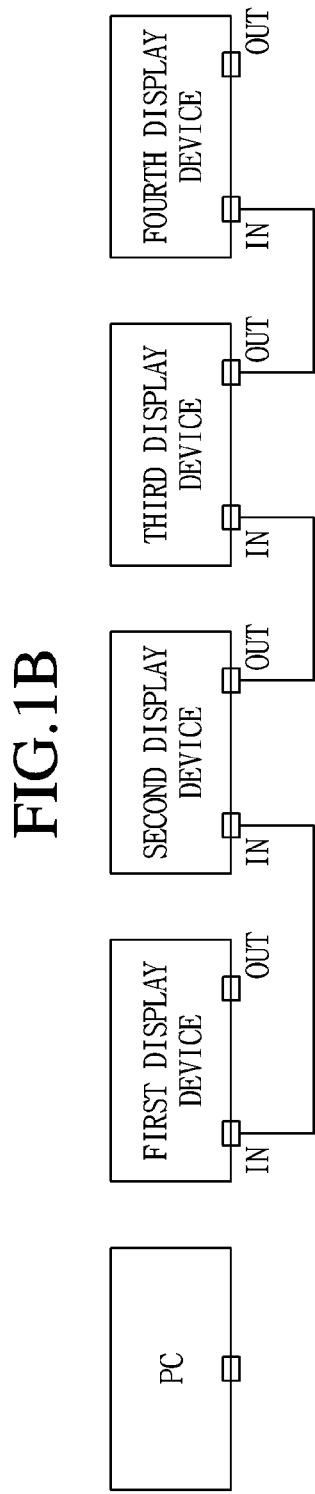

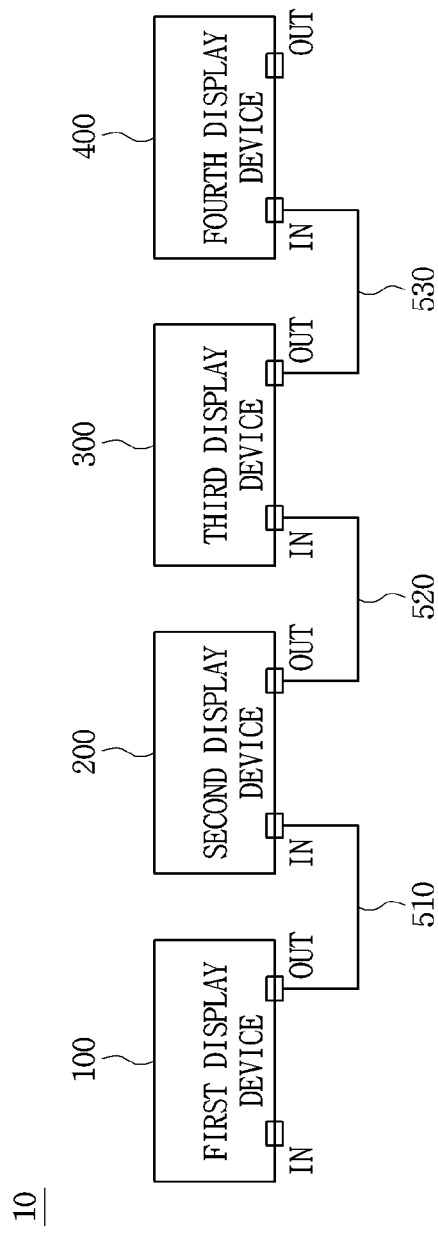

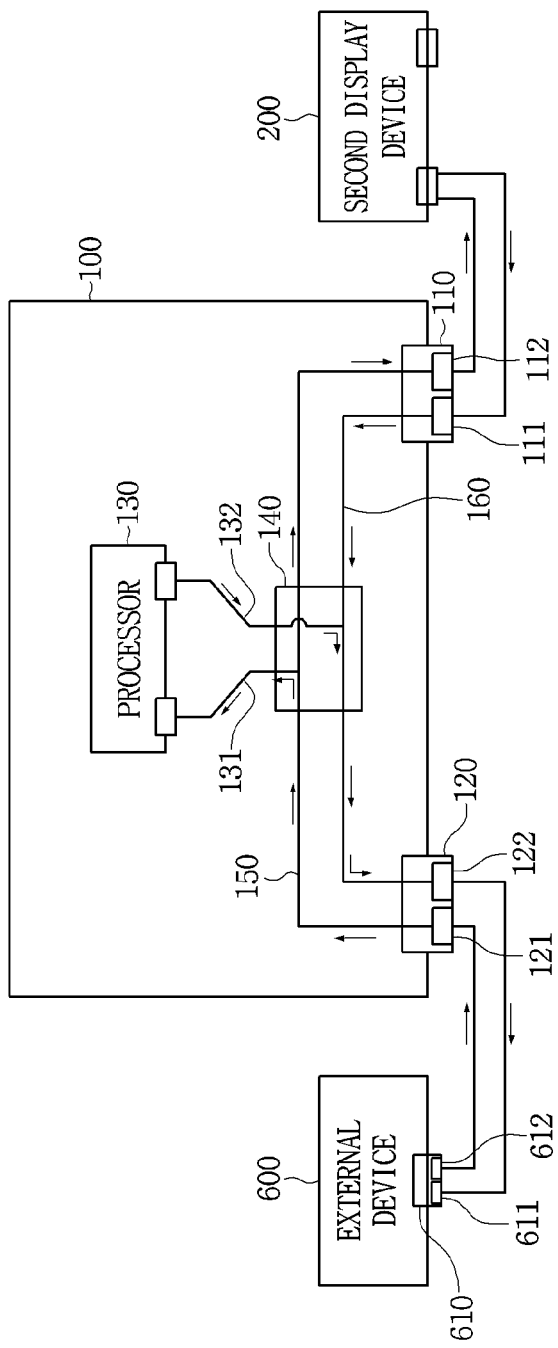

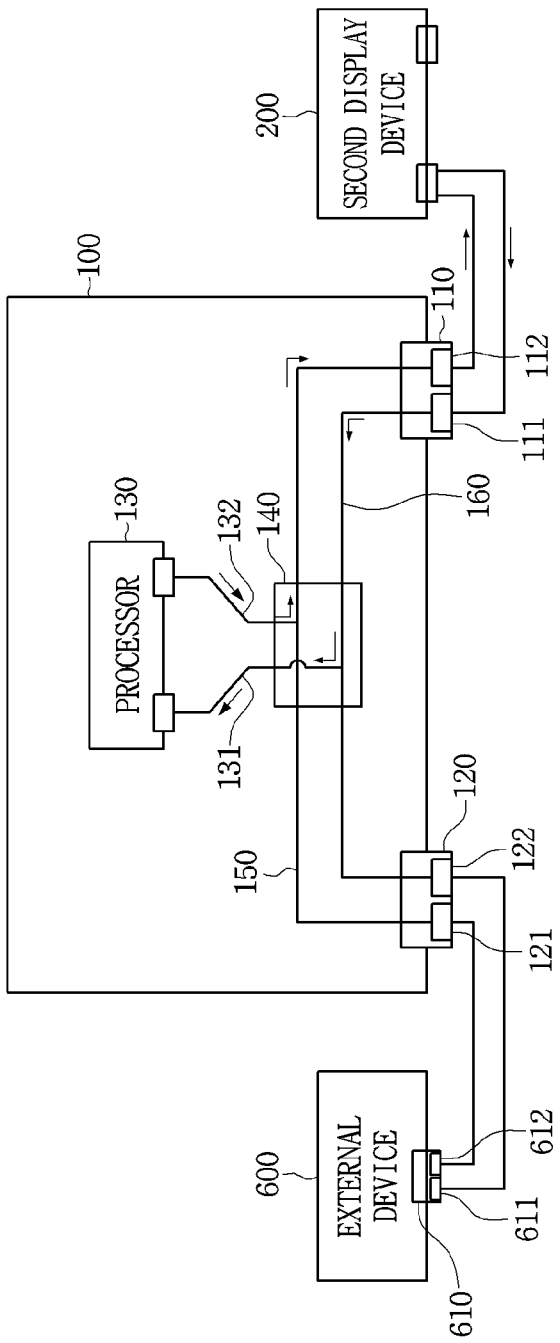

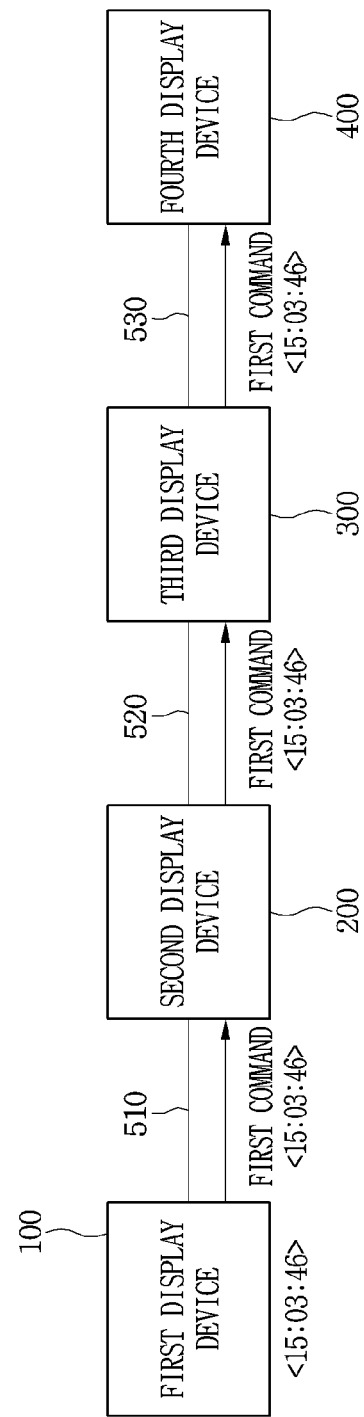

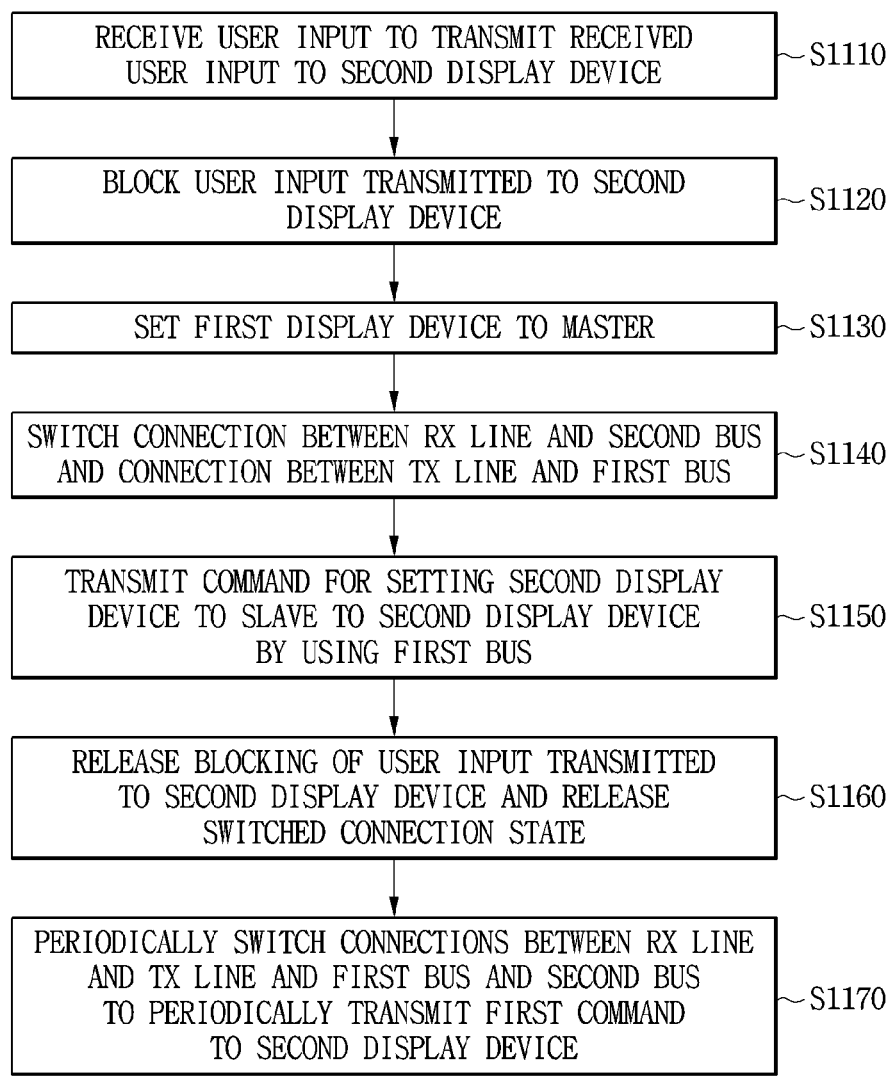

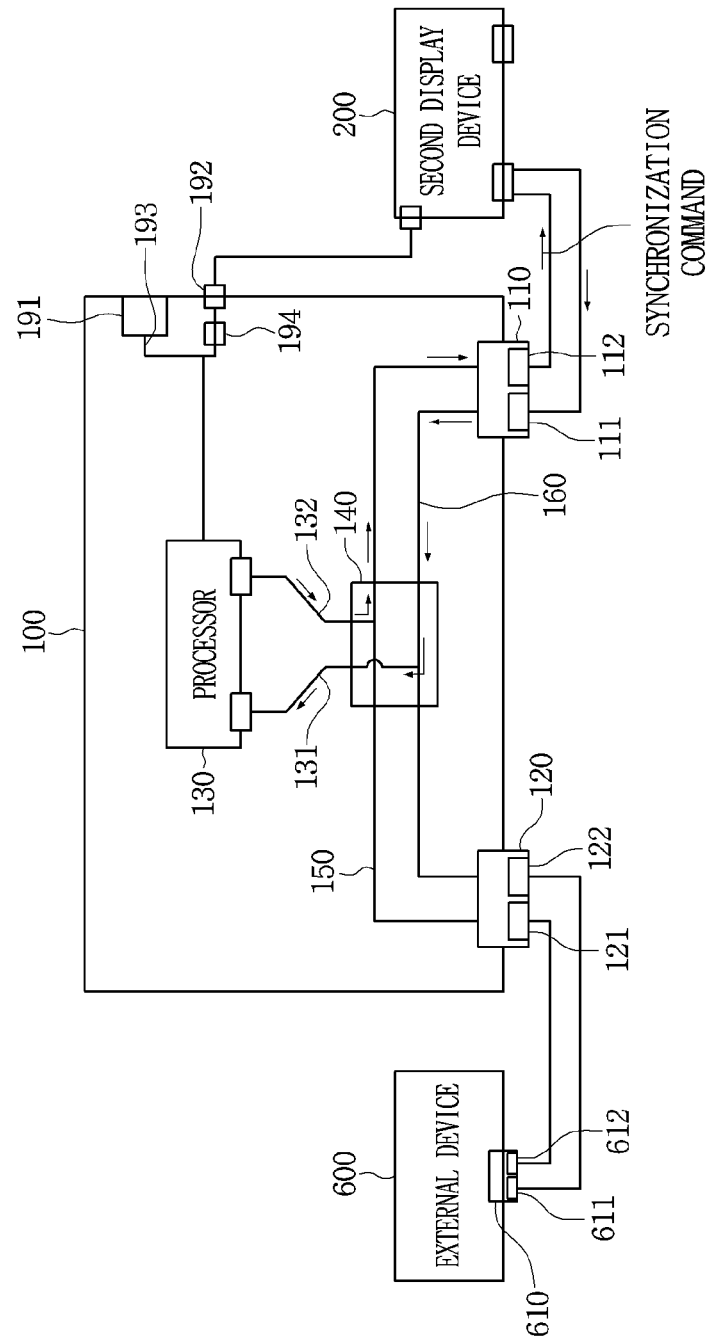

FIG.15A
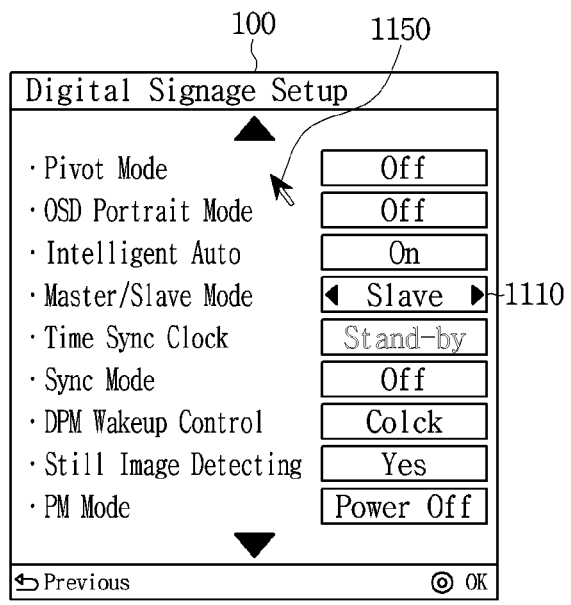
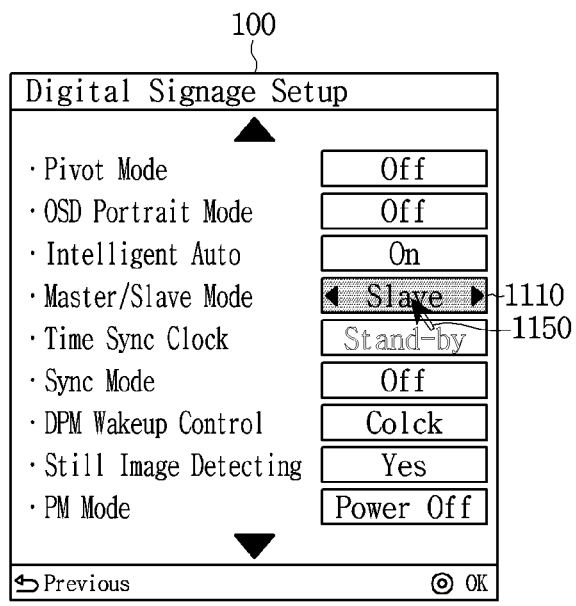

FIG.15B
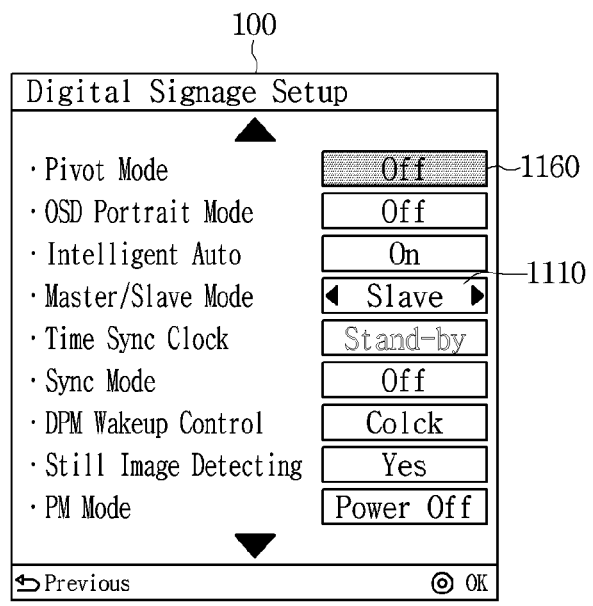
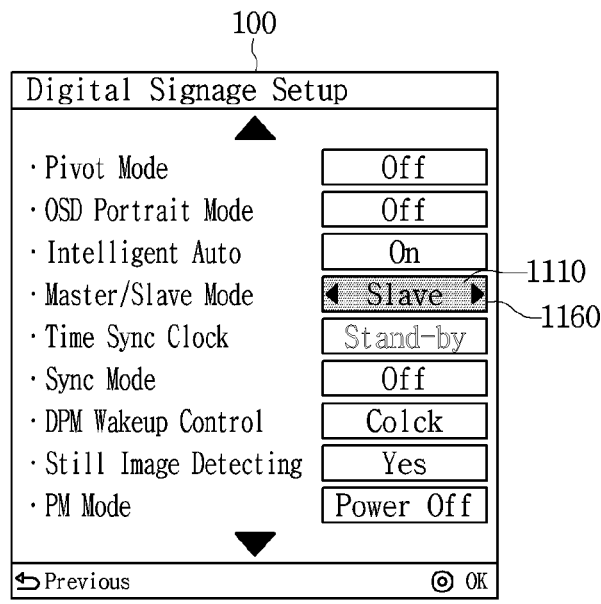

FIG.15C
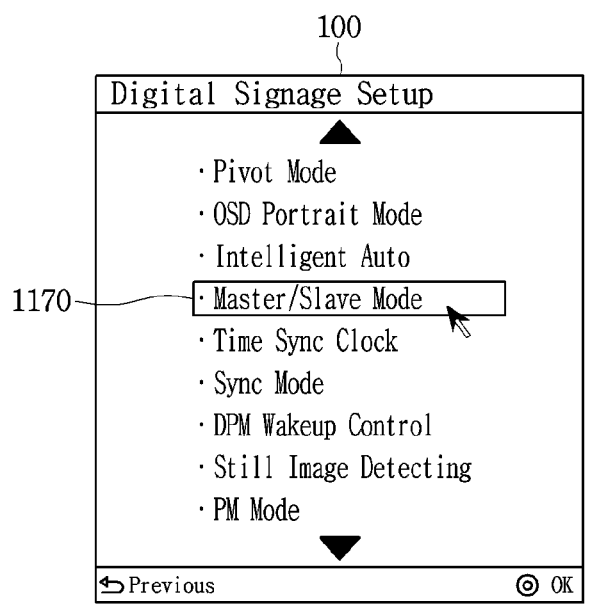
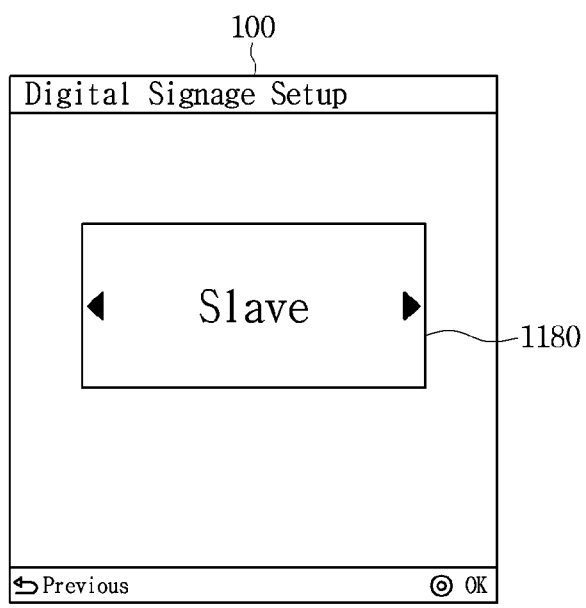

FIG.17

DISPLAY DEVICE AND COMMAND TRANSMISSION METHOD THEREOF

CROSS-REFERENCE TO RELATED APPLICATIONS

This application is the National Stage filing under 35 U.S.C. 371 of International Application No. PCT/KR2015/012563, filed on Nov. 20, 2015, which claims the benefit of earlier filing date and right of priority to Korean Application No. 10-2015-0104599, filed on Jul. 23, 2015 and also claims the benefit of U.S. Provisional Application Ser. No. 62/113,544, filed on Feb. 9, 2015, the contents of which are all hereby incorporated by reference herein in their entirety.

TECHNICAL FIELD

The present invention relates to a method which transmits a command from a master to a slave by switching a connection between a processor, a first bus, and a second bus in a display device configuring a multi-display system.

BACKGROUND ART

In a multi-display system where a plurality of display devices are connected to each other, a control command for controlling each display device is executed by connecting a personal computer (PC). In detail, the plurality of display devices may be connected in a daisy chain type and connected to the PC, or each of the plurality of display devices may be connected to the PC and may receive a control command from the PC to perform an operation corresponding to the control command.

There is a preferable case where like a time synchronization command among control commands transmitted to the display devices, a matter set in one display device is applied to another display device as-is, and in this case, a connection of a PC is not necessary. However, even in this case, there is inconvenience where a PC should be connected to the multi-display system for synchronizing a time of the display devices as illustrated in FIG. 1A.

There is a method where even without connecting a PC to the multi-display device, a control command such as a direct time synchronization command is transferred from a display device, acting as a master, to a display device acting as a slave.

In order for the master to directly transfer a control command to the slave, as illustrated in FIG. 1B, there is inconvenience where a connection between an OUT port of the master and an IN port of the slave should be changed from an IN port of the master to an IN port of the slave whenever the control command is transferred.

Moreover, in a case of connecting the IN port of the master to the IN port of the slave, since it is unable to connect the master and a PC, there is inconvenience where the PC issues a control command to the display devices, or it is unable to check a state of a display device.

DISCLOSURE

Technical Problem

The present invention is for solving the above-described problem, an object of the present invention relates to a method which transmits a command from a master to a slave by switching a connection between a processor, a first bus, and a second bus in a display device configuring a multi-display system.

Technical Solution

A device configuring a multi-display system according to an embodiment of the present invention includes a first interface unit providing an access path for access to another device, a second interface unit connected to the first interface unit through a first bus and a second bus, a processor transmitting a first command and receiving a second command, a TX line connecting the processor to 'one of the first bus and the second bus' to transfer the first command, an RX line connecting the processor to 'one of the first bus and the second bus' to transfer the second command, and a switch unit connecting the RX line and one of the first bus and the second bus, or connecting the TX line and one of the first bus and the second bus, wherein the processor controls the switch unit to respectively connect the RX line to the first bus and the TX line to the second bus or to respectively connect the RX line to the second bus and the TX line to the first bus.

In a command transmission method of a device configuring a multi-display system an embodiment of the present invention, the device includes a first interface unit providing an access path for access to another device, a second interface unit connected to the first interface unit through a first bus and a second bus, a processor transmitting a first command and receiving a second command, a TX line connecting the processor to 'one of the first bus and the second bus' to transfer the first command, and an RX line connecting the processor to 'one of the first bus and the second bus' to transfer the second command, and the command transmission method includes a step of connecting the RX line to the first bus and the TX line to the second bus and a step of switching a connection between the RX line and the first bus and a connection between the TX line and the second bus to connect the RX line to the second bus and the TX line to the first bus.

DESCRIPTION OF DRAWINGS

FIG. 1A is a diagram describing a related art method of controlling a display device configuring a multi-display system by connecting a PC to the multi-display system.

FIG. 1B is a diagram describing a related art method of controlling a display device configuring a multi-display system by establishing an IN port-In port connection on the display device.

FIG. 2 is a diagram for describing a multi-display system according to an embodiment of the present invention.

FIGS. 8A to 8C are diagrams for describing a command transmission method of a display device when an external device is connected to a multi-display system according to an embodiment of the present invention.

FIGS. 10A and 10B are diagrams for describing a method of synchronizing a time of a plurality of display devices configuring a multi-display system according to an embodiment of the present invention.

FIG. 11 is a flowchart describing a method of setting a master/slave of a plurality of display devices configuring a multi-display system according to an embodiment of the present invention.

FIGS. 13A to 13E are diagrams for describing a method of setting a master/slave of a plurality of display devices configuring a multi-display system according to an embodiment of the present invention.

FIGS. 15A to 15C are diagrams describing a method of blocking a user input transmitted to a second display device according to a first user input, according to an embodiment of the present invention.

FIG. 17 is a diagram illustrating a UI screen displayed on a plurality of display devices 100, 200, 300, and 400 configuring a multi-display system when a slave setting command is transmitted, according to an embodiment of the present invention.

MODE FOR INVENTION

Figure 3:
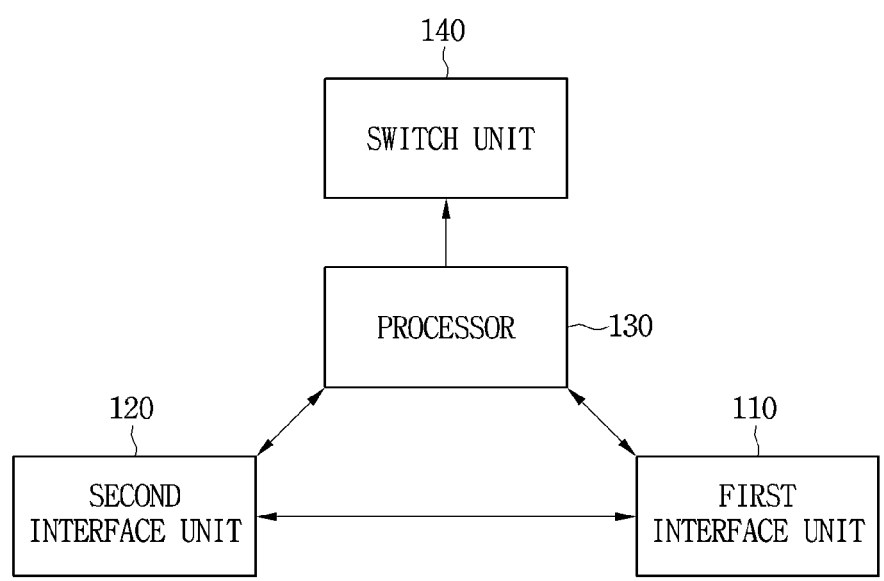
FIG. 3 is a block diagram for describing a configuration of a display device configuring a multi-display system according to an embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

FIG. 2 is a diagram for describing a multi-display system according to an embodiment of the present invention.

A device configuring a multi-display system may be a display device. Also, in the following description, a description will be made on the assumption that the device configuring the multi-display system is a display device. However, the present invention is not limited thereto, and the device configuring the multi-display system is all kinds of devices capable of transmitting a control command to a plurality of devices configuring the multi-display system.

According to FIG. 2, a multi-display system 10 may include a plurality of display devices 100, 200, 300, and 400. Also, the plurality of display devices 100, 200, 300, and 400 configuring the multi-display system may be connected to each other by cables 510, 520, and 530.

An external device (not shown) may be connected to the multi-display system 10, and communication may be performed in a universal asynchronous receiver/transmitter (UART) communication scheme between the external device (not shown) and a first display device 100 or the plurality of display devices 100, 200, 300, and 400. Here, the UART communication is a serial-based communication scheme which enables a connection between a display device and a PC, and thus, denotes a communication scheme which enables a PC to communicate with or exchange data with a modem or other devices.

In the UART communication, RS-232C may be used as a communication standard. Here, the RS-232C is one of data communication standards which are internationally standardized in order for a PC to exchange with materials.

IN and OUT interfaces of the plurality of display devices 100, 200, 300, and 400 may each be an RS-232C interface, and a cable which connects the external device (not shown) and the first display device 100 or the plurality of display devices 100, 200, 300, and 400 may be an RS-232C cable.

Therefore, the plurality of display devices 100, 200, 300, and 400 configuring the multi-display system may be connected to a PC according to RS-232C standard and may receive data from the PC or transmit data to the PC.

In detail, communication using RS-232C may use a receive (RX) line for data reception and a transmit (TX) line for data transmission. Also, as illustrated in FIG. 2, in a case where the plurality of display devices 100, 200, 300, and 400 configuring the multi-display system 10 are connected to each other in a daisy chain type, a command transmitted from the external device may be transferred to each of the first display device 100, a second display device 200, a third display device 300, and a fourth display 400 through a receive (RX) line included in each of the cables 510, 520, and 530 and the plurality of display devices 100, 200, 300, and 400.

Moreover, when a connection between an RX line of the first display device 100 and a first bus and a connection between a TX line and a second bus described below are switched and thus the TX line is connected to the first bus and the RX line is connected to the second bus, a command generated by the first display device 100 may be transferred to each of the second display device 200, the third display device 300, and the fourth display 400 through the receive (RX) line included in each of the cables 510, 520, and 530 and the second, third, and fourth display devices 200, 300, and 400. A detailed operation relevant thereto will be described below.

The plurality of display devices 100, 200, 300, and 400 configuring the multi-display system may transfer data to the external device (not shown). For example, as illustrated in FIG. 2, when the plurality of display devices 100, 200, 300, and 400 configuring the multi-display system 10 are connected to each other in the daisy chain type, commands transmitted from the plurality of display devices 100, 200, 300, and 400 may be transmitted to the external device (not shown) through a transmit (TX) line included in each of the cables 510, 520, and 530 and the plurality of display devices 100, 200, 300, and 400.

Moreover, when the connection between the RX line of the first display device 100 and the first bus and the connection between the TX line and the second bus described below are switched and thus the TX line is connected to the first bus and the RX line is connected to the second bus, a command generated by each of the second display device 200, the third display device 300, and the fourth display 400 may be transferred to the first display device 100 through the transmit (TX) line included in each of the cables 510, 520, and 530 and the second, third, and fourth display devices 200, 300, and 400. A detailed operation relevant thereto will be described below.

The multi-display system 10 may be a digital signage system, and the plurality of display devices 100, 200, 300, and 400 included in the multi-display system 10 may be a plurality of display devices configuring the digital signage system. A display device configuring the digital signage system will be described in detail with reference to FIG. 19.

In the present embodiment, it is described that a communication is performed between an external device and a multi-display system or a plurality of display devices configuring the multi-display system according to the RS-232C standard, but the present invention is not limited thereto. In detail, the present invention may be applied to all multi-display systems which perform communication by using a TX-RX communication line such as the UART communication scheme.

In the present embodiment, it is described that a plurality of display devices are connected to each other in the daisy chain type, but the present invention is not limited thereto. In detail, the present invention may be applied to various connection combinations of a plurality of display devices connected to a display device acting as a master by the UART communication scheme.

FIG. 3 is a block diagram for describing a configuration of a display device configuring a multi-display system according to an embodiment of the present invention.

According to FIG. 3, a device 100 configuring a multi-display system may include a first interface unit 110 which may correspond to an RS-232C interface discussed above, a second interface unit 120 which may correspond to an RS-232C interface discussed above, a processor 130, and a switch unit 140.

The second interface unit 120 may communicate with an external device or another display device. In detail, the second interface unit 120 may include a receive (RX) line for data reception and may receive a command from the external device or the other display device through the RX line of the second interface unit 120. Also, the second interface unit 120 may include a transmit (TX) line for data transmission and may transmit data to the external device or the other display device through the TX line of the second interface unit 120.

The first interface unit 110 may communicate with another display device. In detail, the first interface unit 110 may include a receive (RX) line for data reception and may receive a command from the other display device through the RX line. Also, the first interface unit 110 may include a transmit (TX) line for data transmission and may transmit a command to the other display device through the TX line of the second interface unit 120.

A second display device 200, a third display device 300, and a fourth display device 400 may include the same configuration as that of the first display device 100. Also, the second display device 200 and the third display device 300 may communicate with another display device through a first interface unit and a second interface unit included in each of the second display device 200 and the third display device 300. However, the fourth display device 400 is a last display device receiving a command from a PC and merely receives the command, and may not transfer data to the other display device. Therefore, the fourth display device 400 may not include a first interface unit.

In the present embodiment, the first display device 100 is connected to an external device and the second display device, and thus, a description will be made on the assumption that the second interface unit 120 of the second display device 100 communicates with the external device and the first interface unit 110 communicates with the second display device 200.

The display device 100 may include a first bus (not shown) which connects the first interface unit 110 and the second interface unit 120.

The first bus (not shown) may connect the first interface unit 110 and the second interface unit 120. In detail, the first bus may be connected to an RX line of the second interface unit 120 and a TX line of the first interface unit 110.

The first bus may be a bus which is connected to the RX line of the second interface unit 120 and transfers a command, received through the second interface unit 120 from the external device, to the processor 130.

Moreover, the first bus may be a bus which is connected to the RX line of the second interface unit 120 and the TX line of the first interface unit 110 and transfers a command, received through the second interface unit 120 from the external device, to the first interface unit 110, thereby transmitting the command to the second, third, and fourth display devices 200, 300, and 400.

Moreover, the first bus may be a bus which, when a connection between the RX line and the first bus and a connection between the TX line and the second bus are switched, is connected to the TX line of the first interface unit 100 to transmit a command, generated by the processor 130, to the second, third, and fourth display devices 200, 300, and 400.

The display device 100 may include a second bus (not shown) which connects the first interface unit 110 and the second interface unit 120.

The second bus (not shown) may connect the first interface unit 110 and the second interface unit 120. In detail, the second bus may be connected to a TX line of the second interface unit 120 and an RX line of the first interface unit 110.

The second bus may be a bus which is connected to the TX line of the second interface unit 120 and the RX line of the first interface unit 110 and transfers a command, received through the second interface unit 120 from the second, third, and fourth display devices 200, 300, and 400, to an external device (not shown).

Moreover, the second bus may be a bus which is connected to the TX line of the second interface unit 120 and transfers a command, generated by the processor 130, to the external device through the second interface unit 120.

Moreover, the second bus may be a bus which is connected to the RX line of the first interface unit 110 and transfers a command, received through the first interface unit 110 from the second, third, and fourth display devices 200, 300, and 400, to the processor 130.

The first bus and the second bus will be described in more detail with reference to FIG. 4.

The processor 130 may transmit a first command. In detail, the processor 130 may generate the first command and may transmit the generated first command through a TX line which connects the processor 130 and one of the first bus and the second bus.

Moreover, the processor 130 may receive a second command. In detail, the processor 130 may receive the second command through an RX line which connects the processor 130 and 'one of the first bus and the second bus'.

The RX line (not shown) may connect the processor 130 and the first bus and may receive a command transmitted from an external device to transfer the command to the processor 130. Also, the RX line (not shown) may connect the processor 130 and the second bus and may receive, through the second bus, a command transmitted from the second display device to transfer the command to the processor 130.

The TX line (not shown) may connect the processor 130 and the second bus and may transfer a command, which is generated by the processor 130 and is transmitted to an external device, to the second bus. Also, the TX line (not shown) may connect the processor 130 and the first bus and may transfer a command, which is generated by the processor 130 and is transmitted to the second display device, to the first bus.

The processor 130 may control the switch unit to connect the RX line to the first bus and connect the TX line to the second bus or to connect the RX line to the second bus and connect the TX line to the first bus.

In detail, in a state where the RX line is connected to the first bus and the TX line is connected to the second bus, the processor 130 may control the switch unit 140 so that by switching a connection between the RX line and the first bus and a connection between the TX line and the second bus, the TX line transferring the first command generated by the processor 130 is connected to the first bus, and the RX line transferring the second command received by the processor 130 is connected to the second bus.

On the other hand, in a state where the RX line is connected to the second bus and the TX line is connected to the first bus, the processor 130 may control the switch unit 140 so that by switching a connection between the RX line and the second bus and a connection between the TX line and the first bus, the TX line transferring the first command generated by the processor 130 is connected to the second bus, and the RX line transferring the second command received by the processor 130 is connected to the first bus.

The switch unit 140 may switch a connection between the RX line and the TX line and the first bus and the second bus according to control by the processor 130 to connect the RX line to one of the first bus and the second bus or to connect the TX line to one of the first bus and the second bus. Also, the switch unit 140 may be a multiplexer (MUX).

A display unit (not shown) may display a UI screen for controlling the plurality of display devices 100, 200, 300, and 400 configuring the multi-display system.

FIG. 4 is a diagram describing connections between the RX line and TX line and the first bus and second bus, according to an embodiment of the present invention.

Figure 4A:
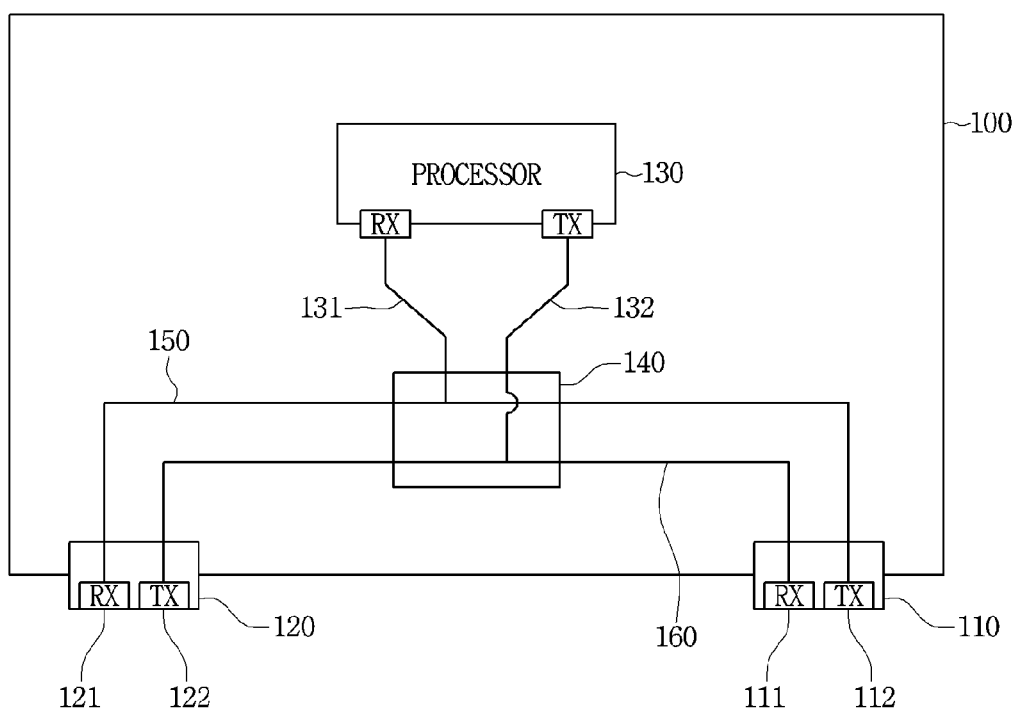
FIGS. 4A and 4B are diagrams for describing a connection between an RX line and a TX line and a first bus and a second bus, according to an embodiment of the present invention.

FIG. 4A is a diagram illustrating a state before connections between the RX line and TX line and the first bus and second bus are switched, namely, a state where the RX line is connected to the first bus and the TX line is connected to the second bus.

Before the connections between the RX line 131 and TX line 132 and the first bus 150 and second bus line 160 are switched, the RX line 131 is connected to the first bus 150, and the TX line 132 is connected to the second bus 160.

The processor 130 may control the switch unit 140 to switch the connections between the RX line 131 and TX line 132 and the first bus 150 and second bus line 160. In this case, the switch unit 140 may be controlled by the processor 130 to connect the RX line 131 to the second bus 160 and to connect the TX line 132 to the first bus 150.

Figure 4B:
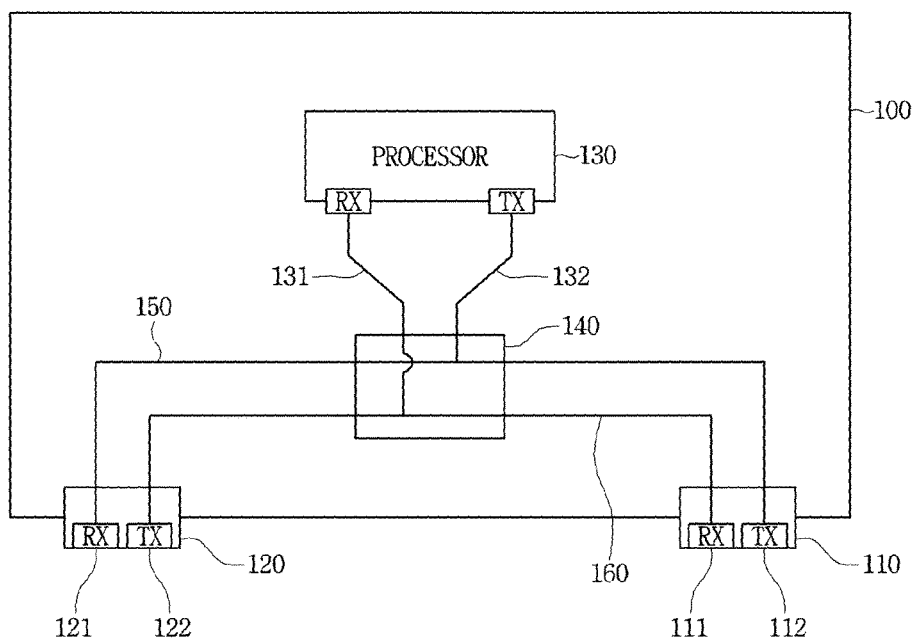

A state where connections between the RX line 131 and TX line 132 and the second bus 160 and first bus 150 are switched is illustrated in FIG. 4B.

Figure 5:
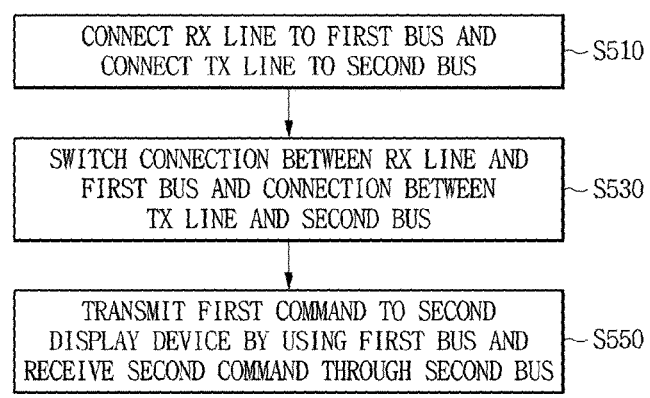
FIG. 5 is a flowchart for describing a command transmission method of a first display device in a state where a TX line is connected to a first bus and an RX line is connected to a second bus, according to an embodiment of the present invention.

FIG. 5 is a flowchart for describing a command transmission method of a first display device in a state where connections between the RX line 131 and TX line 132 and the second bus 160 and first bus 150 are switched.

According to FIG. 5, the command transmission method of the first display device configuring a multi-display system may include an operation (S510) of connecting an RX line to a first bus and connecting a TX line to a second bus, an operation (S530) of switching a connection between the RX line and the first bus and a connection between the TX line and the second bus to connect the RX line to the second bus and to connect the TX line to the first bus, and an operation (S550) of transmitting a first command to a second display device by using the first bus and receiving, through the second bus, a command transmitted from the second display device.

This will be described in detail with reference to FIG. 6.

Figure 6:
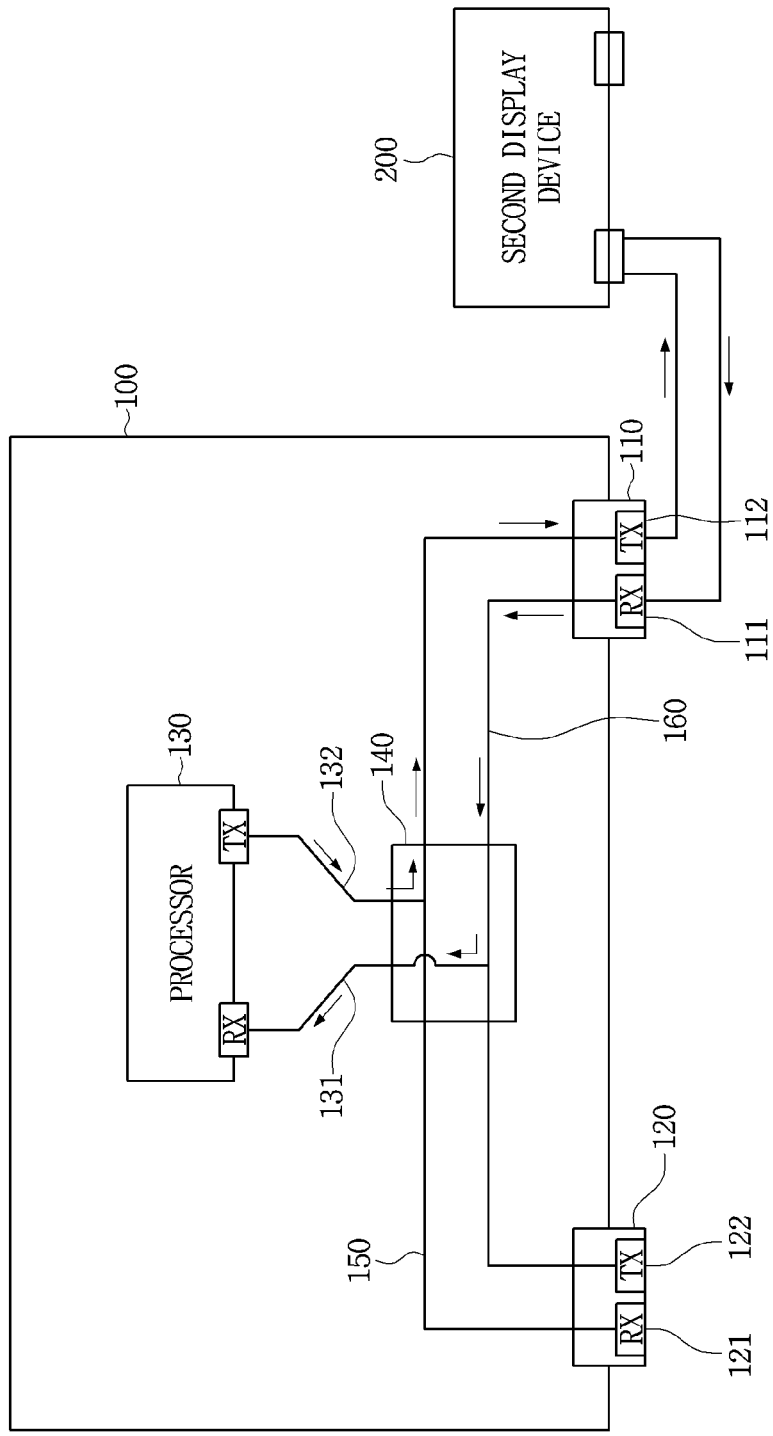
FIG. 6 is a diagram for describing a method of transmitting or receiving a command to or from a second display device in a state where a TX line is connected to a first bus and an RX line is connected to a second bus, according to an embodiment of the present invention.

FIG. 6 is a diagram for describing a method of transmitting or receiving a command to or from a second display device in a case where a connection between a processor and a first bus and a connection between the processor and a second bus are switched, and thus, an RX line is connected to a second bus and a TX line is connected to a first bus.

According to FIG. 6, in a state where the RX line 131 is connected to the first bus 150 and the TX line 132 is connected to the second bus 160, when connections between the RX line 131 and TX line 132 and the first bus 150 and second bus 160 are switched, the RX line 131 may be connected to the second bus 160 and the TX line 132 may be connected to the first bus 150.

Furthermore, the processor 130 may transmit a first command to the second display device 200 by using the first bus 150. In detail, the processor 130 may generate a first command and may transmit the generated first command to the second display device 200 through the TX line 132, the first bus 150 connected to the TX line 132 of the processor 130, and a TX line 112 of the first interface unit 110 connected to the first bus 150.

The first command, which is generated and transmitted by the processor 130 in a state where the RX line 131 is connected to the second bus 160 and the TX line 132 is connected to the first bus 150, may be all kinds of control commands for controlling states of the second, third, and fourth display devices 200, 300, and 400. For example, the first command may be a control command for controlling at least one of functions, which are implemented in the second, third, and fourth display devices 200, 300, and 400, such as the images, sounds, ON/OFF, and modes of the second, third, and fourth display devices 200, 300, and 400.

Moreover, the first command which is generated and transmitted by the processor 130 in a state where the RX line 131 is connected to the second bus 160 and the TX line 132 is connected to the first bus 150 may be a synchronization command for synchronizing the second, third, and fourth display devices 200, 300, and 400 with the first display device 100.

For example, the first command may be a command for synchronizing a setting time of each of the second, third, and fourth display devices 200, 300, and 400 with a setting time of the first display device 100. Also, the first command may be a command for synchronizing a content reproduction start time of the first display device 100 with a content reproduction start time of each of the second, third, and fourth display devices 200, 300, and 400.

In addition, the first command which is generated and transmitted by the processor 130 in a state where the RX line 131 is connected to the second bus 160 and the TX line 132 is connected to the first bus 150 may be a command for synchronizing a setting value (for example, contrast, brightness, color, sharpness, color concentration, color temperature, white balance, horizontal/vertical position, horizontal size, volume, language, key, screen effect, mode, etc.) of each of the second, third, and fourth display devices 200, 300, and 400 with the first display device 100.

The first display device 100 according to another embodiment of the present invention may further include an input unit (not shown) that receives a user input. Also, the first command may be a command corresponding to a user input received through the input unit (not shown).

In detail, when the user input is received through the input unit (not shown), the processor 130 may generate the first command corresponding to the received user input and may transmit the generated first command to the second display device 200.

For example, when a user input for setting "brightness" of a display unit to a specific value is received through the input unit (not shown), the processor 130 may generate a first command for setting "brightness" of the display unit to the specific value and may transmit the first command to the second display device 200.

As another example, when a user input for setting a time of each of the first display device 100, the second display device 200, the third display device 300, and the fourth display device 400 to a specific time is received through the input unit (not shown), the processor 130 may generate a first command for setting the time of the first display device 100 to the received specific time and setting the time of each of the second display device 200, the third display device 300, and the fourth display device 400 to the specific time and may transmit the first command to the second display device 200.

As another example, when a user input for setting a time of the first display device 100 to a specific time and a command for periodically synchronizing times of a plurality of display devices configuring the multi-display system 10 is received through the input unit (not shown), the processor 130 may periodically generate a first command for setting the time of the first display device 100 to the specific time and synchronizing a setting time with a time of the first display device 100 and may transmit the first command to the second display device 200.

When connections between the RX line 131 and TX line 132 and the first bus 150 and second bus 160 are switched and thus the RX line 131 of the processor 130 is connected to the second bus 160 and the TX line 132 of the processor 130 is connected to the first bus 150, the processor 130 may receive a second command through the second bus 160. In this case, the second command which is received by the processor 130 in a state where the RX line 131 is connected to the second bus 160 and the TX line 132 is connected to the first bus 150 may be a command transmitted from the second display device 200.

In detail, when the second display device 200 transmits a command, the processor 130 may receive the command, transmitted from the second display device 200, through an RX line 121 of the second interface unit 120, the second bus 160, and the RX line 131. Here, the command transmitted from the second display device 200 may include a command which is generated by each of the third display device 300, the fourth display device 400, and the fifth display device 500 and is transmitted through the second display device 200, in addition to a command generated by the second display device 200.

The command transmitted from the second display device 200 may be an ACK command which is a response to the first command received by the second display device. In detail, as described above, when the first display device 100 transmits a command to the second, third, and fourth display devices 200, 300, and 400, each of the second, third, and fourth display devices 200, 300, and 400 may generate and transmit an ACK command based on the transmitted command, and the processor 130 of the first display device may receive the ACK command, transmitted from each of the second, third, and fourth display devices 200, 300, and 400, from the second display device 200. Therefore, the first display device 100 may check whether the first command transmitted from the first display device 100 is received by each of the second, third, and fourth display devices 200, 300, and 400.

Moreover, the command transmitted from the second display device 200 may be state information of each of the second, third, and fourth display devices 200, 300, and 400. For example, the command transmitted from the second display device 200 may be a setting value, such as contrast, brightness, color, sharpness, color concentration, color temperature, white balance, horizontal/vertical position, horizontal size, volume, language, key, screen effect, or mode, of each of the second, third, and fourth display devices 200, 300, and 400.

The first display device 100 may further include a display unit 180, and the processor 130 may check whether the first command is received by each of the second, third, and fourth display devices 200, 300, and 400, and may control the display unit 180 to display the setting value of each of the second, third, and fourth display devices 200, 300, and 400.

In this manner, the display device 100 according to the present embodiment may switch connections between the RX line 131 and TX line 132 and the first bus 150 and second bus 160, and thus, even in a state where the display device is not connected to an external device such as a PC, a control command generated by the display device 100 may be transmitted to the second display device.

Moreover, the display device 100 according to the present embodiment may switch connections between the RX line 131 and TX line 132 and the first bus 150 and second bus 160, and thus, without changing a connection between the first display device and the second display device to an IN port-IN port connection, a command may be transmitted to the second display device even in a state where an IN port-OUT port connection is maintained.

Moreover, the display device 100 according to the present embodiment may display the ACK command of each of the second, third, and fourth display devices 200, 300, and 400 based on the first command or the setting value of each of the second, third, and fourth display devices 200, 300, and 400, thereby enabling a user to check, through the first display device 100, whether the first command of each of the second, third, and fourth display devices 200, 300, and 400 is received and a current state even without connecting the display system 10 to an external device such as a PC.

Figure 7:
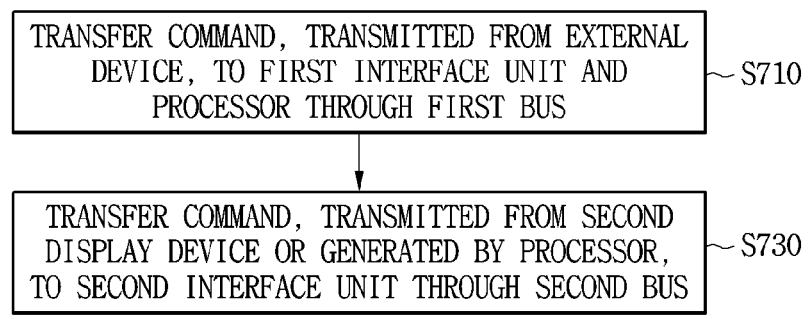
FIG. 7 is a flowchart for describing a command transmission method of a display device when an external device is connected to a multi-display system according to an embodiment of the present invention.

FIG. 7 is a flowchart for describing a command transmission method of a display device when an external device is connected to a multi-display system according to an embodiment of the present invention.

According to FIG. 7, an operation of connecting an RX line to a first bus and connecting a TX line to a second bus may include an operation (S710) of transferring a command, transmitted from an external device, to a first interface unit and a processor through the first bus and an operation (S730) of transferring a command, transmitted from a second display device or generated by the processor, to a second interface unit through the second bus.

This will be described in detail with reference to FIG. 8.

FIG. 8 is a diagram for describing a command transmission method of a display device when an external device is connected to a multi-display system.

FIG. 8A is a diagram for describing transmission of a command before connections between the RX line 131 and TX line 132 and the first bus 150 and second bus 160 are switched, in a state where a first display device is connected to an external device and a second display device.

According to FIG. 8A, the second interface unit 120 may communicate with an external device 600. In detail, an RX line 111 of the second interface unit 120 may be connected to a TX line 612 of an interface unit 610 of the external device to receive a command from the external device. Also, a TX line 122 of the second interface unit 120 may be connected to an RX line 611 of the interface unit 610 of the external device to transmit a first command, generated by the processor 130, to the external device or transfer a command generated by each of the second, third, and fourth display devices 200, 300, and 400.

The command transmitted from the external device may be a control command for checking states of the plurality of display devices 100, 200, 300, and 400 configuring the display system 10.

Here, the external device 600 may be a PC, but may be all devices capable of transmitting the control command to the plurality of display devices 100, 200, 300, and 400 configuring the multi-display system without being limited thereto.

The command transmitted from the external device 600 may be transferred to the processor 130 of the first display device 100 and the second display device 200.

In detail, the command transmitted from the external device 600 may be received by the RX line 121 of the second interface unit 120 of the first display device through a cable and the TX line 612 of the interface unit 610 of the external device.

In this case, the command received by the RX line 121 of the second interface unit 120 may be transferred to the RX line 131 through the first bus 150. Also, the processor 130 may receive a second command through the RX line 131, wherein the second command may be a command transmitted from the external device 600.

Moreover, the command received by the RX line 121 of the second interface unit 120 may be transferred to the first interface unit 110 through the first bus 150. Also, the command transferred to the first interface unit 110 may be received by an RX line of an interface unit of the second display device 200 through a cable and the TX line 112 of the first interface unit.

A command transmitted from the second display device 200 or a first command transmitted from the processor 130 may be transferred to the external device 600 through the second bus 160.

Here, the first command generated and transmitted by the processor 130 or the command which is generated by each of the second, third, and fourth display devices 200, 300, and 400 and is transmitted to the external device 600 may be an ACK command which is a response to the command transmitted from the external device, or may be state information about each of the first, second, third, and fourth display devices 100, 200, 300, and 400.

The command transmitted from the second display device 200 may be received by the RX line 111 of the first interface unit 110 of the first display device through the cable and the TX line of the interface unit of the second display device 200.

In this case, the command received through the RX line 111 of the first interface unit 110 may be transferred to the second interface unit 120 through the second bus 160. Also, the command transferred to the second interface unit 120 may be transmitted to the RX line 611 of the interface unit of the external device through the cable and the TX line 122 of the second interface unit.

Here, the command transmitted from the second display device 200 may include a command generated by the second display device 200, a command generated by the third display device 300, and a command generated by the fourth display device 400.

The first command generated by the processor 130 may be transmitted to the second interface unit 120 through the TX line 132 and the second bus 160. In this case, the command transmitted to the second interface unit 120 may be transmitted to the RX line 611 of the interface unit of the external device through the cable and the TX line 122 of the second interface unit.

FIG. 8B is a diagram describing a case where by switching connections between the RX line 131 and TX line 132 and the first bus 150 and second bus 160, the RX line is connected to the second bus, and the TX line is connected to the first bus.

According to FIG. 8B, the processor 130 may switch connections between the RX line 131 and TX line 132 and the first bus 150 and second bus 160, thereby connecting the RX line 131 to the second bus 160 and connecting the TX line 132 to the first bus 150.

Furthermore, when the RX line 131 is connected to the second bus 160 and the TX line 132 is connected to the first bus 150, the processor 130 may transmit a first command to the second display device 200 by using the first bus 150. In detail, the processor 130 may generate a first command and may transmit the generated first command to the second display device 200 through the TX line 132 of the processor 130, the first bus 150 connected to the TX line 132 of the processor 130, and the TX line 122 of the second interface unit 120. Here, the first command may be all kinds of control commands for controlling states of the second, third, and fourth display devices 200, 300, and 400. Also, the first command may be a synchronization command for synchronizing the second, third, and fourth display devices 200, 300, and 400 with the first display device 100.

When the RX line 131 is connected to the second bus 160 and the TX line 132 is connected to the first bus 150, the processor 130 may receive a second command through the second display device 160. Here, the second command may be a command transmitted from the second display device 200. In detail, when the second display device 200 transmits a command, the processor 130 may receive the transmitted command through the RX line 111 of the first interface unit 110, the second bus 160, and the RX line 131.

In this manner, the display device 100 according to the present embodiment may switch connections between the RX line 131 and TX line 132 and the first bus 150 and second bus 160, and thus, even in a state where the display device is connected to an external device, a control command generated by the display device 100 may be transmitted to the second display device.

Moreover, the first display device 100 may further include an input unit (not shown), and may control all of the plurality of display devices 100, 200, 300, and 400 included in the multi-display system 10 by using only a manipulation of a user in the display device 100 without using an external device, in addition to a case where the user controls the multi-display system by using the external device in a state of being connected to the external device.

After the connections between the RX line 131 and TX line 132 and the first bus 150 and second bus 160 are switched and thus a first command is transmitted to the second display device 200, the processor 130 may control the switch unit 140 to release a switched state. In detail, in a state where the RX line 131 is connected to the second bus 160 and the TX line 132 is connected to the first bus 150, when the first command is transmitted to the second display device 200, the processor 130 may control the switch unit 140 so that by again switching the connections between the RX line 131 and TX line 132 and the first bus 150 and second bus 160, the RX line 131 is connected to the first bus 150, and the TX line 132 is connected to the second bus 160.

In this manner, after the first display device 100 transmits the first command, the first display device 100 may again switch the connections between the RX line 131 and TX line 132 and the first bus 150 and second bus 160, thereby allowing the plurality of display devices 100, 200, 300, and 400 to be again controlled by the external device. Particularly, in a general case, the present invention may be useful for a case where control of the external device 600 is performed, and the first display device 100 transmits a time synchronization command for a short time. In detail, the multi-display system 10 may be controlled by the external device 600, and then, the multi-display system 10 may instantaneously switch connections between the processor 130 and the first bus 150 and second bus 160 to transmit a synchronization command and may release the switching of the connections between the processor 130 and the first bus 150 and second bus 160, thereby allowing the multi-display system 10 to be again controlled by the external device.

The processor 130 may periodically switch the connections between the RX line 131 and TX line 132 and the first bus 150 and second bus 160 to periodically transmit the first command, generated by the processor 130, to the second display device 200.

In detail, in a general case, the processor 130 may maintain a state (i.e., a state of FIG. 8A) where a connection between the RX line 131 and the first bus 150 and a connection between the TX line 132 and the second bus 160 are not switched, and then, may switch the connection between the RX line 131 and the first bus 150 and the connection between the TX line 132 and the second bus 160 to connect the RX line 131 to the second bus 160 and to connect the TX line 132 to the first bus 150. Also, as the connection between the RX line 131 and the first bus 150 and the connection between the TX line 132 and the second bus 160 are switched, the processor 130 may transmit the first command, generated by the processor 130, to the second display device 200.

Moreover, after the first command is transmitted to the second display device 200, the processor 130 may control the switch unit 140 so that by again switching the connection between the RX line 131 and the first bus 150 and the connection between the TX line 132 and the second bus 160, the RX line 131 is connected to the first bus 150, and the TX line 132 is connected to the second bus 160.

Furthermore, the processor 130 may repeat a process, which connects the RX line 131 to the second bus 160 and connects the TX line 132 to the first bus 150 to transmit the first command and connects the RX line 131 to the first bus 150 and connects the TX line 132 to the second bus 160, at a certain period, thereby periodically transmitting the first command, generated by the processor 130, to the second display device 200.

The first command transmitted from the first display device 100 to the second display device 200 may be a command for synchronizing a time of the second display device 200 with the first display device 100. In detail, the processor 130 may transmit a setting time of the first display device 100 and a command which allows the setting time of the first display device 100 to match a setting time of each of the second, third, and fourth display devices 200, 300, and 400.

Moreover, the processor 130 may periodically switch a connection between the RX line 131 and the first bus 150 and a connection between the TX line 132 and the second bus 160, thereby periodically transmitting a command for synchronizing a time of each of the second, third, and fourth display devices 200, 300, and 400 with the second display device 200.

In this manner, by periodically switching the connections between the RX line 131 and TX line 132 and the first bus 150 and second bus 160, the processor 130 may receive a command from an external device such as a PC connected to the multi-display system 10 and may periodically transmit a synchronization command, generated by the first display device, to the second, third, and fourth display devices.

Figure 8C:
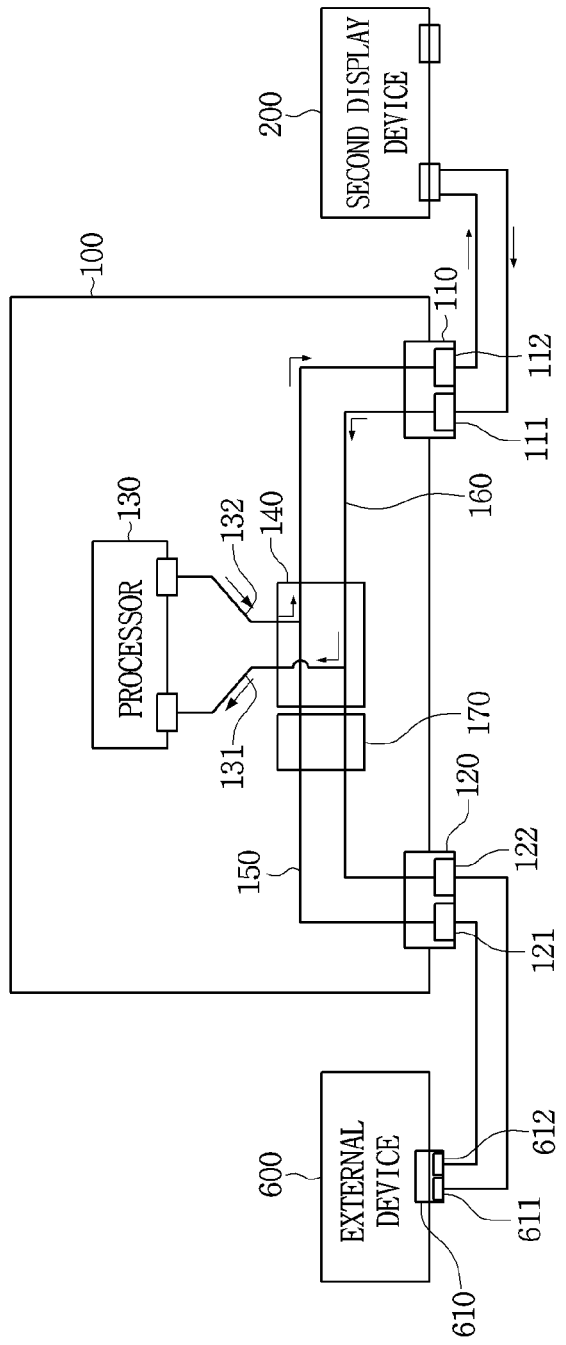

FIG. 8C is a diagram for describing a display device 100 configuring a multi-display system according to another embodiment of the present invention.

According to FIG. 8C, the display device 100 may further include a second switch unit 170.

The processor 130 may control the second switch unit 170 which switches connections between the RX line 131 and TX line 132 and the first bus 150 and second bus 160 to connect the RX line 131 to the second bus 160 and to connect the TX line 132 to the first bus 150, and thus, blocks a command which is transmitted from an external device 600 and is transferred to the first interface unit 110.

In detail, as in FIG. 8C, in order to prevent a command transmitted from the external device to be transferred to only the second, third, and fourth display devices 200, 300, and 400 in a state where the RX line 131 is connected to the second bus 160 and the TX line 132 is connected to the first bus 150, the processor 130 may control the second switch unit 170 to connect the TX line 132 to the first bus 150, connect the RX line 131 to the second bus 160, and block the command transmitted from the external device 600.

Moreover, similarly, in order to prevent only a command transmitted from each of the second, third, and fourth display devices 200, 300, and 400 to be transferred to the external device 600 in a state where the TX line 132 is connected to the first bus 150 and the RX line 131 is connected to the second bus 160, the processor 130 may control the second switch unit 170 to connect the TX line 132 to the first bus 150, connect the RX line 131 to the second bus 160, and block the command transferred to the external device 600.

In the present embodiment, it is described that the second switch unit 170 is provided separately from the switch unit 140, but the present embodiment is not limited thereto. For example, the second switch unit 170 may be integrated into the switch unit 140, and thus, the switch unit 140 may perform a function performed by the second switch unit 170.

FIG. 9 is a diagram for describing a flow of a command in a multi-display system connected in a daisy chain type.

The second display device 200, the third display device 300, and the fourth display 400 may include all elements of the first display device 100 illustrated in FIG. 8C. However, the second display device 200, the third display device 300, and the fourth display 400 may not include the switch unit 140 and the second switch unit 170.

Figure 9A:
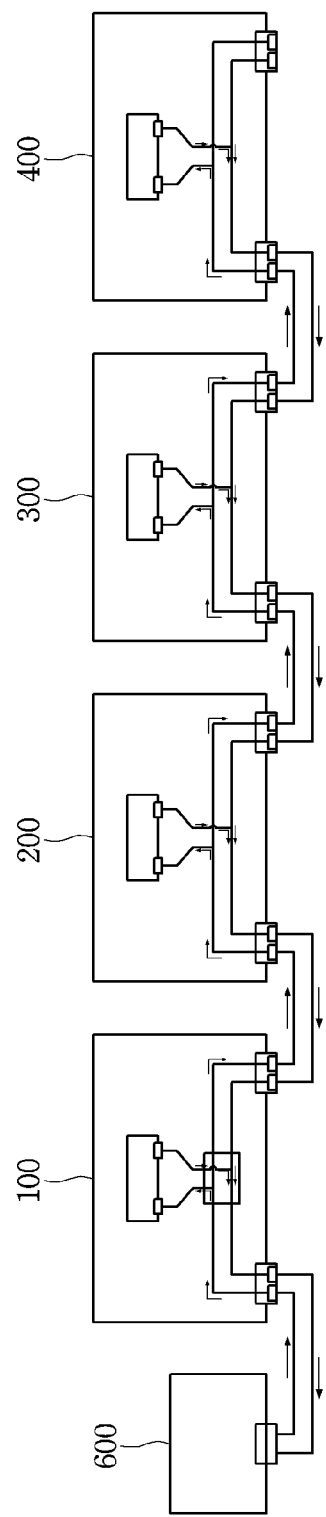
FIGS. 9A and 9B are diagrams for describing a flow of a command in a multi-display system connected in a daisy chain type, according to an embodiment of the present invention.

FIG. 9A is a diagram illustrating a multi-display system controlled by an external device in a state where the RX line 131 is connected to the first bus 150 of the first display 100 and the second bus 160 is connected to the TX line 132. The plurality of display devices 100, 200, 300, and 400 configuring the multi-display system may be connected to each other in the daisy type, and the first display device 100 may be connected to an external device 600.

According to FIG. 9A, a command transmitted from the external device 600 may be transmitted to the first display device 100 by using a cable. In this case, the command transmitted to the first display device 100 may be transferred to the processor 130 of the first display device and the first interface unit 110 of the first display device through the first bus 150. Also, the command transmitted from the external device 600 may be transferred to the second display device 200 through the first interface unit 110 of the first display device.

Similarly to the first display device 100, in the second display device 200 and the third display device 300, the processor may receive the command transmitted from the external device 600 and may transmit the command to a next display device.

The fourth display device 400 may receive the command, transmitted from the external device, from the third display device 300.

The plurality of display devices 100, 200, 300, and 400 configuring the multi-display system may transmit a command to the external device.

In detail, a processor of the fourth display device 400 may generate a command, and then, may transmit the command to the third display device 300 by using a second bus of the fourth display device.

A processor of the third display device 300 may generate a command and then may transmit the command to the second display device by using a second bus of the third display device, and moreover, the command transmitted from the fourth display device 400 may be transferred to the second display device through the second bus of the third display device.

A processor of the second display device 200 may generate a command and then may transmit the command to the first display device by using a second bus of the second display device, and moreover, the command transmitted from the fourth display device 400 and the command transmitted from the third display device 300 may be transferred to the second display device through the second bus of the second display device 200.

A processor of the first display device 100 may generate a first command and then may transmit the first command to the external device 600 by using a second bus 160 of the first display device 100, and moreover, the command transmitted from the fourth display device 400, the command transmitted from the third display device 300, and the command transmitted from the second display device 200 may be transferred to the external device 600 through the second bus 160 of the first display device 100.

Figure 9B:
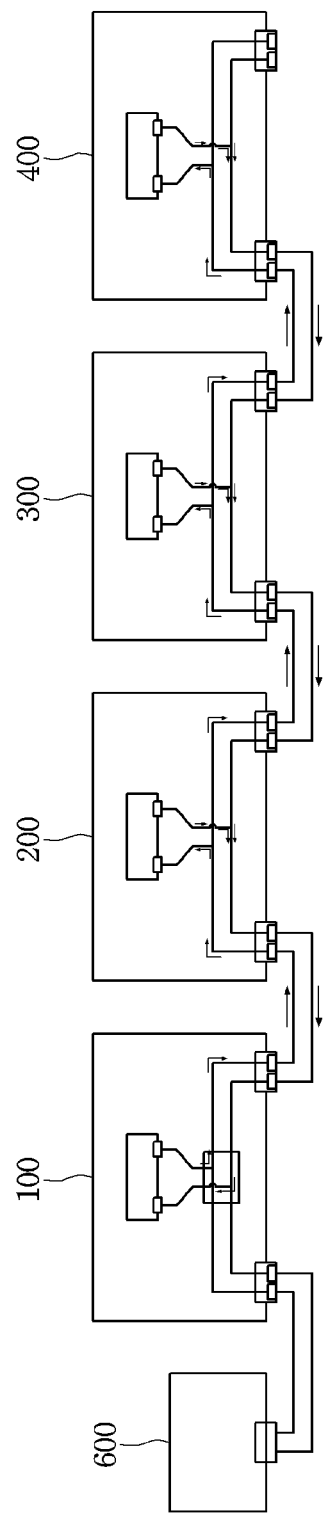

FIG. 9B is a diagram illustrating a multi-display system controlled by the first display device 100 in a state where connections between the RX line 131 and TX line 132 and the first bus 150 and second bus 160 are switched, and thus, the RX line 131 is connected to the second bus 160 and the TX line 132 is connected to the first bus 150.

When the connections between the RX line 131 and TX line 132 and the first bus 150 and second bus 160 are switched, and thus, the RX line 131 is connected to the second bus 160 and the TX line 132 is connected to the first bus 150, the processor 130 of the first display device may transmit a first command, generated by the processor 130, to the second display device 200, the third display device 300, and the fourth display 400.

In detail, the processor 130 of the first display device may transmit the first command which is to be transmitted to the second display device 200, the third display device 300, and the fourth display 400, and may transmit the generated command to the second display device 200 through the TX line 132, the first bus 150, and the second interface unit 120. A process where a processor of each of the second display device 200, the third display device 300, and the fourth display 400 receives a command transmitted to the second display device 200 and transfers the received command to a next display device is the same as a process, described above with reference to FIG. 9A, of transferring a command transmitted from an external device, and thus, is omitted.

The second display device 200, the third display device 300, and the fourth display 400 may transmit a command to the first display device 100. A method where the processor of each of the second display device 200, the third display device 300, and the fourth display 400 transmits a command to the first display device 100 and a process where a second bus line of each of the second display device 200 and the third display device 300 transfers a command are the same as the process, described above with reference to FIG. 9A, of transferring the command transmitted from the external device, and thus, are omitted.

The first display device 100 may receive a command, generated by the processor of each of the second display device 200, the third display device 300, and the fourth display 400, from the second display device 200. Also, the command generated by the processor of each of the second display device 200, the third display device 300, and the fourth display 400 may be transferred to the processor 130 through the second interface unit 120 of the first display device 100, the second bus 160, and the RX line 131.

In the present embodiment, the multi-display system 10 is described as including four display devices 100, 200, 300, and 400, but is not limited thereto. The multi-display system 10 may be configured with two display devices, three display devices, or five or more display devices, and if only a display device corresponding to the first display device 100 of the present embodiment is included in the multi-display system 10, the multi-display system 10 configured with a various number of display devices may be implemented irrespective of the number of display devices.

In the present embodiment, a plurality of display devices are described as being connected to each other in the daisy chain type, but are not limited thereto. In detail, the present invention may be applied to various connection combinations of a plurality of display devices connected to a display device acting as a master by the UART communication scheme.

FIG. 10 is a diagram for describing a method of synchronizing a time of a first display device and a time of each of second, third, and fourth display devices according to an embodiment of the present invention.

According to FIG. 10A, a first command transmitted from the first display device 100 may be a command for synchronizing a time of each of the second display device 200, the third display device 300, and the fourth display device 400 with a time of the first display device 100.

In detail, when the processor 130 switches connections between the RX line 131 and TX line 132 and the first bus 150 and second bus 160 to connect the RX line 131 to the second bus 160 and to connect the TX line 132 to the first bus 150, the processor 130 may transmit the first command to the second display device 200. In this case, the first command may be the command for synchronizing the time of each of the second display device 200, the third display device 300, and the fourth display device 400 with the time of the first display device 100.

The first command may include time information which is set in the first display device. For example, when the a time which is set in the first display device is "15:03:46 on Mar. 24, 2015", the processor 130 may transmit the first command, including time information "15:03:46 on Mar. 24, 2015", to the second display device 200. A processor of the second display device 200 may receive the first command and may set a time of the second display device 200 to "15:03:46 on Mar. 24, 2015". In this manner, a time of each of the third display device 300 and the fourth display device 400 may also be set to "15:03:46 on Mar. 24, 2015".

Moreover, the processor 130 of the first display device may periodically switch connections between the RX line 131 and TX line 132 and the first bus 150 and second bus 160 to periodically transmit a time synchronization command to the second display device 200, the third display device 300, and the fourth display device 400.

In this manner, the display device 100 according to the present embodiment may periodically transmit the time synchronization command to the second display device 200, the third display device 300, and the fourth display 400 to synchronize times of the plurality of display devices 100, 200, 300, and 400 configuring the multi-display system even without connecting an external device or changing an OUT-IN connection between the first display device 100 and the second display device 200 to an IN-IN connection.

Figure 10B:
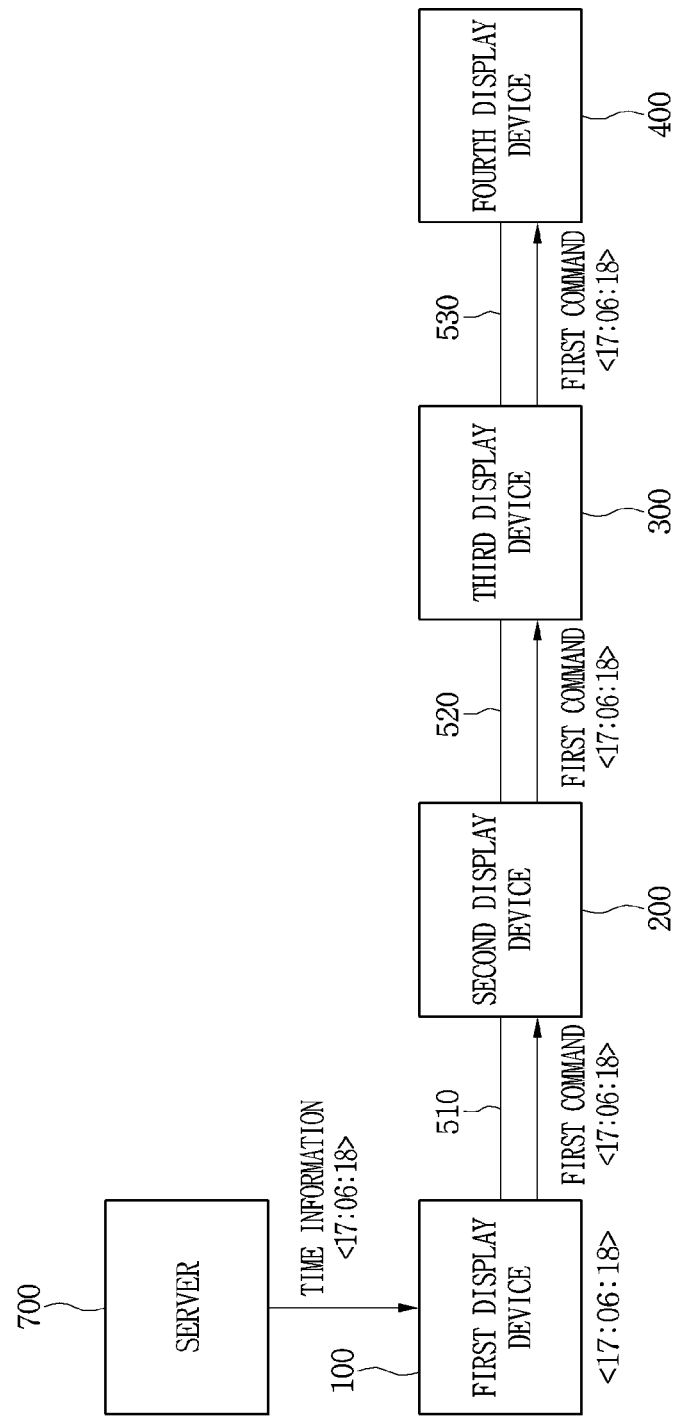

FIG. 10B is a diagram describing a method where the first display device 100 receives time information from a server and synchronizes times of the plurality of display devices 100, 200, 300, and 400 configuring the multi-display system by using the received time information.

The first display device 100 may further include a communicator (not shown) which communicates with the server.

The communicator (not shown) may communicate with a server 700. In detail, the communicator (not shown) may receive information about a current time from the server 700. Here, the server 700 may be a server that provides a standard time of a district where a display device is located.

The processor 130 may set a time of the first display device to a time provided from the server 700 by using time information received through the communicator (not shown). Also, the processor 130 may switch connections between the RX line 131 and TX line 132 and the first bus 150 and second bus 160 to connect the RX line 131 to the second bus 160 and to connect the TX line 132 to the first bus 150 and may transmit the time information, received from the server 700, to the second display device 200 or may transmit time information about the first display device 100, which is set by using the time information received from the server 700, to the second display device 200.

Furthermore, the second display device 200, the third display device 300, and the fourth display 400 may set a time of each display device by using received time information, thereby synchronizing the plurality of display devices 100, 200, 300, and 400 configuring the multi-display system.

As described above, in the present invention, the first display device may communicate with the server to receive time information and may synchronize the times of all of the plurality of display devices configuring the multi-display system by using the received time information. Therefore, the cost can be reduced in comparison with a case where each of the plurality of display devices 100, 200, 300, and 400 configuring the multi-display system receives time information in communication with the server to set a time, and a setting time of each of the plurality of display devices 100, 200, 300, and 400 can be prevented from being changed depending on a situation of a network over which each of the plurality of display devices 100, 200, 300, and 400 is connected to the server.

FIG. 11 is a diagram describing a method of setting one of a plurality of display devices configuring a multi-display system to a master.

Here, the master may be a display device that switches connections between the RX line 131 and TX line 132 and the first bus 150 and second bus 160 by using a switch unit to transmit a command to other display devices. Also, the master may be a display device that includes an input unit or is directly connected to an external device capable of performing a function of the input unit. Display devices which are not the master may each be a slave.

According to FIG. 11, a command transmission method of a display device configuring a multi-display system according to the present embodiment may include an operation (S1110) of receiving a user input to transmit the received user input to the second display device, an operation (S1120) of blocking the user input transmitted to the second display device according to a first user input being received, an operation (S1130) of setting the first display device to a master, an operation (S1140) of switching connections between the RX line 131 and TX line 132 and the first bus 150 and second bus 160 to connect the RX line to the second bus and to connect the TX line to the first bus, an operation (S1150) of transmitting a command for setting the second display device to a slave to the second display device by using the first bus, an operation (S1160) of releasing the blocking of the user input transmitted to the second display device and switching a connection between the TX line and the first bus and a connection between the RX line and the second bus to connect the TX line to the second bus and to connect the RX line to the first bus, and an operation (S1170) of periodically switching the connections between the RX line 131 and TX line 132 and the first bus 150 and second bus 160 to periodically transmit a first command, generated by the processor, to the second display device.

The operation (S1110) of receiving the user input to transmit the received user input to the second display device will be described in detail with reference to FIG. 12.

Figure 12:
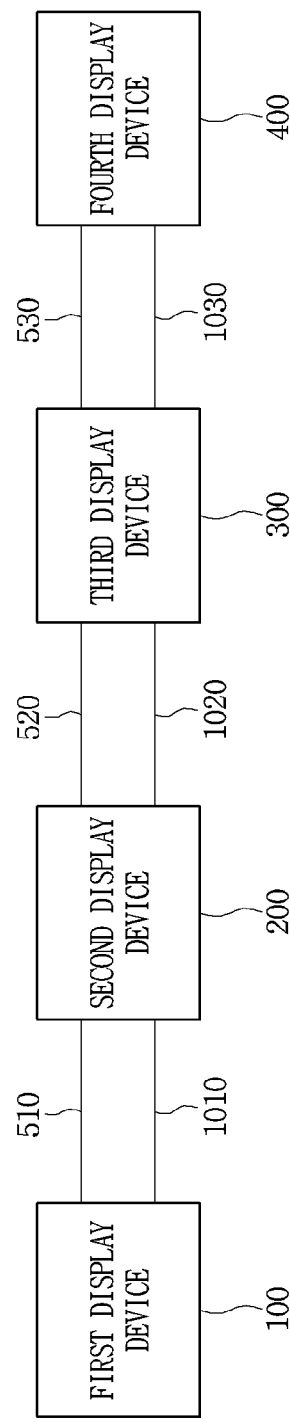
FIG. 12 is a diagram illustrating a process where when a user input is received by a first display device according to an embodiment of the present invention, the received user input is transferred to another display device.

FIG. 12 is a diagram illustrating a process where when a user input is received by the first display device 110, the received user input is transferred to the second display device 200, the third display device 300, and the fourth display 400.

According to FIG. 12, the first display device 100 may include an input unit (not shown) that receives a user input, and may transmit the received user input to the second display device 200, the third display device 300, and the fourth display 400 through user input transmission lines 1010, 1020, and 1030. Accordingly, all of the plurality of display devices 100, 200, 300, and 400 configuring the multi-display system 10 may be integratedly controlled by a user.

In the present embodiment, the user input transmission lines 1010, 1020, and 1030 are illustrated as being connected separately from cables 510, 520, and 530 through which a command generated by an external device or the first display device 100 is transmitted, but are not limited thereto. For example, the user input transmission lines 1010, 1020, and 1030 may be included in the cables 510, 520, and 530, and a user input received by the first display device 100 may be transferred to the second display device 200, the third display device 300, and the fourth display device 400 by an RS-232C communication scheme.

When there is a user input for setting the first display device 100 to a master, in order to prevent all of the second display device 200, the third display device 300, and the fourth display 400 from being set to the master, the first display device 100 may block a user input transmitted to the second display device 200.

Figure 13A:
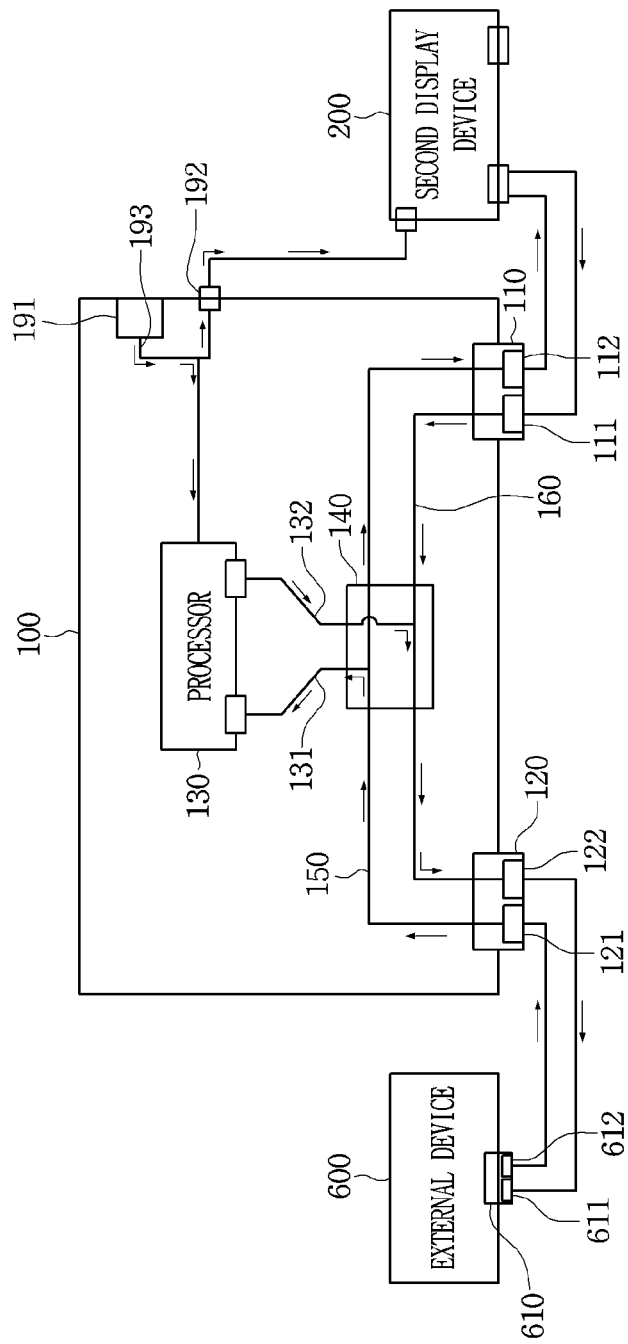

This will be described in detail with reference to FIG. 13A.

The first display device 100 according to an embodiment of the present invention may include an input unit 191, a transmitter 192, and a user input transmission line 193. The input unit 191 may receive a user input, and the user input transmission line may transfer the user input, received through the input unit 191, to the processor 130 and the transmitter 192. The transmitter 192 may transfer the received user input to the second display device 200.

The input unit 191 may receive or process a control signal, such as power ON/OFF, a channel selection, or a screen setting, from a remote control device 200 or may allow the control signal from the processor 130 to be transmitted to the remote control device 200 according to various communication schemes such as Bluetooth, ultra-wideband (WB), ZigBee, a radio frequency (RF) communication scheme, or an infrared (IR) communication scheme.

Figure 13B:
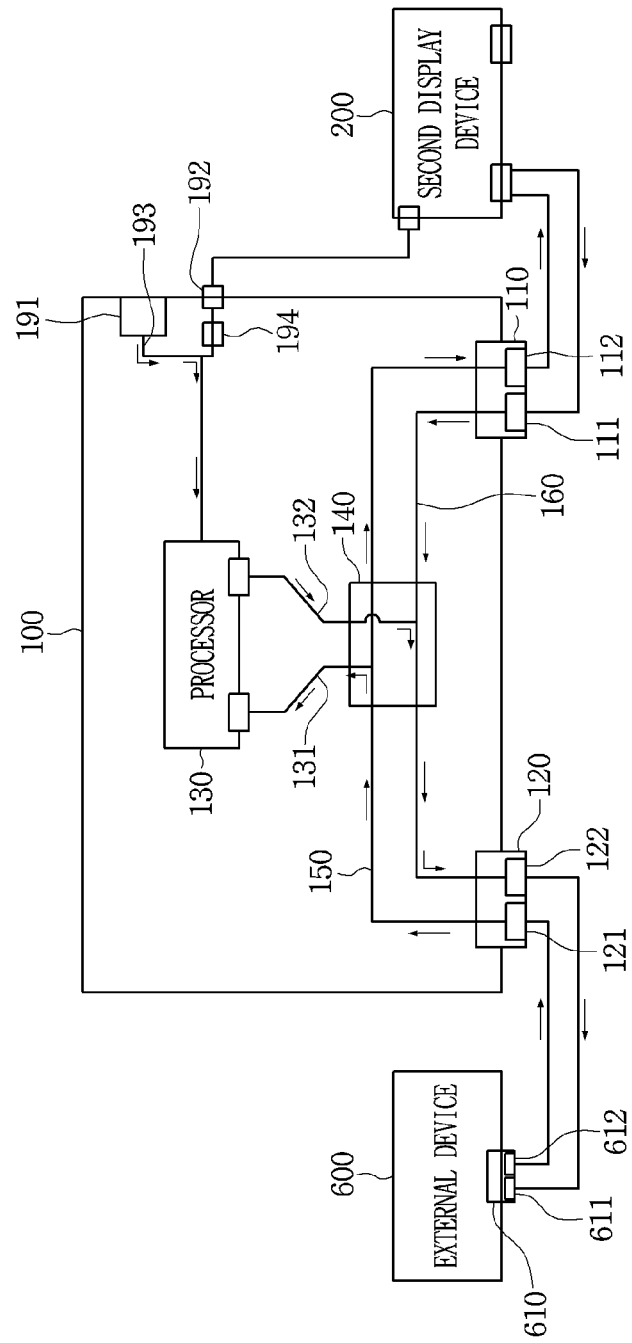

FIG. 13B is a diagram illustrating a first display device in a state where a user input transmitted to a second display device is blocked.

According to FIG. 13B, the first display device 100 may further include a blocker 194. Also, the processor 130 may control the blocker 194 to block a user input transmitted to the second display device 200.

In detail, when a first input of the user is received through the user input receiver 170, the processor 130 may control the blocker 194 to block the user input transmitted to the second display device 200, thereby blocking the user input transmitted to the second display device 200, the third display device 300, and the fourth display 400.

Here, the first input may be a user input which allows an UI window for setting a master/slave to be displayed, a highlight movement to a menu for setting the mater/slave, or a movement of a pointer to the menu for setting the mater/slave.

However, the present embodiment is not limited thereto, and the user input transmitted to the second display device may be blocked by inputting a specific key of a remote control device (not shown) capable of transmitting the user input to the first display device, or inputting a specific key equipped in the first display device 100, or selecting a specific menu displayed on a display unit of the first display device.

When a second input of the user for setting the first display device 100 to the master is received, the processor 130 may set the first display device 100 to the master. In detail, the processor 130 may set the first display device 100 to the master when the user second input for setting the first display device 100 to the master is received by selecting a menu for setting the master/slave on a display screen, inputting a specific key of the remote control device, inputting a specific key included in the first display device 100, or selecting a specific menu displayed on the display unit of the first display device.

Furthermore, when the processor 130 sets the first display device to the master, the first display device 100 may switch connections between the processor 130 and the first bus 150 and second bus 160 to operate as the master which transmits a first command to the second display device 200, the third display device 300, and the fourth display 400.

In this manner, by blocking a user input transmitted from the first display device 100 to the second display device 200, the third display device 300, and the fourth display 400, all of the plurality of display devices 100, 200, 300, and 400 configuring the multi-display system 10 are prevented from being set to the master, and only the first display device 100 may be set to the master.

Figure 13C:
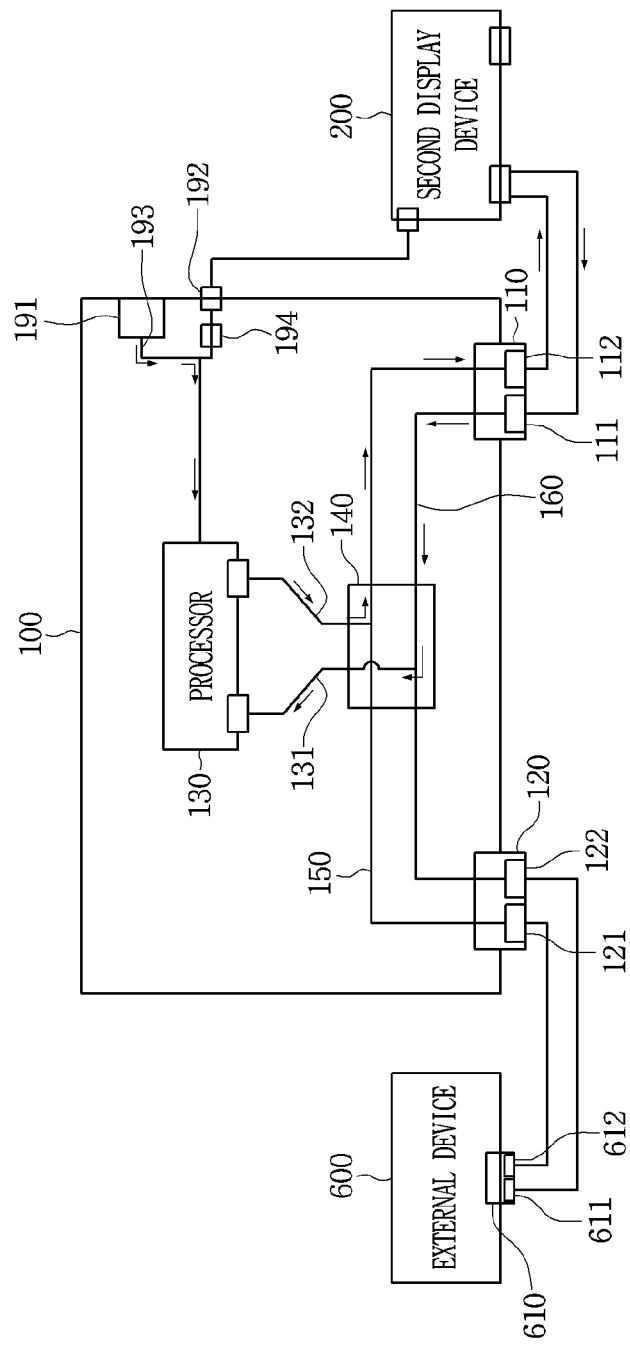

FIG. 13C is a diagram illustrating a first display device in a state where connections between the RX line 131 and TX line 132 and the first bus 150 and second bus 160 are switched, and thus, the RX line 131 is connected to the second bus 160 and the TX line 132 is connected to the first bus 150, in a state where a user input transmitted to a second display device is blocked.

According to FIG. 13C, when the first display device 100 is set to a master, the processor 130 may switch connections between the RX line 131 and TX line 132 and the first bus 150 and second bus 160 to connect the RX line 131 to the second bus 160 and to connect the TX line 132 to the first bus 150.

When the RX line 131 is connected to the second bus 160 and the TX line 132 is connected to the first bus 150, the processor 130 may transmit a command for setting the second display device 200, the third display device 300, and the fourth display 400 to a slave to the second display device by using the first bus. In detail, when the RX line 131 is connected to the second bus 160 and the TX line 132 is connected to the first bus 150, the processor 130 may transmit a first command for setting the second display device 200, the third display device 300, and the fourth display 400 to the slave to the second display device 200 through the TX line 132, the first bus 150, and the TX line 112 of the first interface unit.

In this case, the second display device 200 may set the second display device 200 to the slave by using the received command and may transmit the received command to the third display device 300. The third display device 300 may also operate in a method which is the same as that of the second display device 200, and the fourth display device 400 may set the fourth display device 400 to the slave by using the received command.

In this manner, as a first display device of a plurality of display devices configuring a multi-display system is set to the master, second, third, and fourth display devices may be automatically set to the slave, and thus, an identification (ID) of each of the plurality of display devices may be integratedly set without setting the ID of each of the display devices.

Figure 13D:
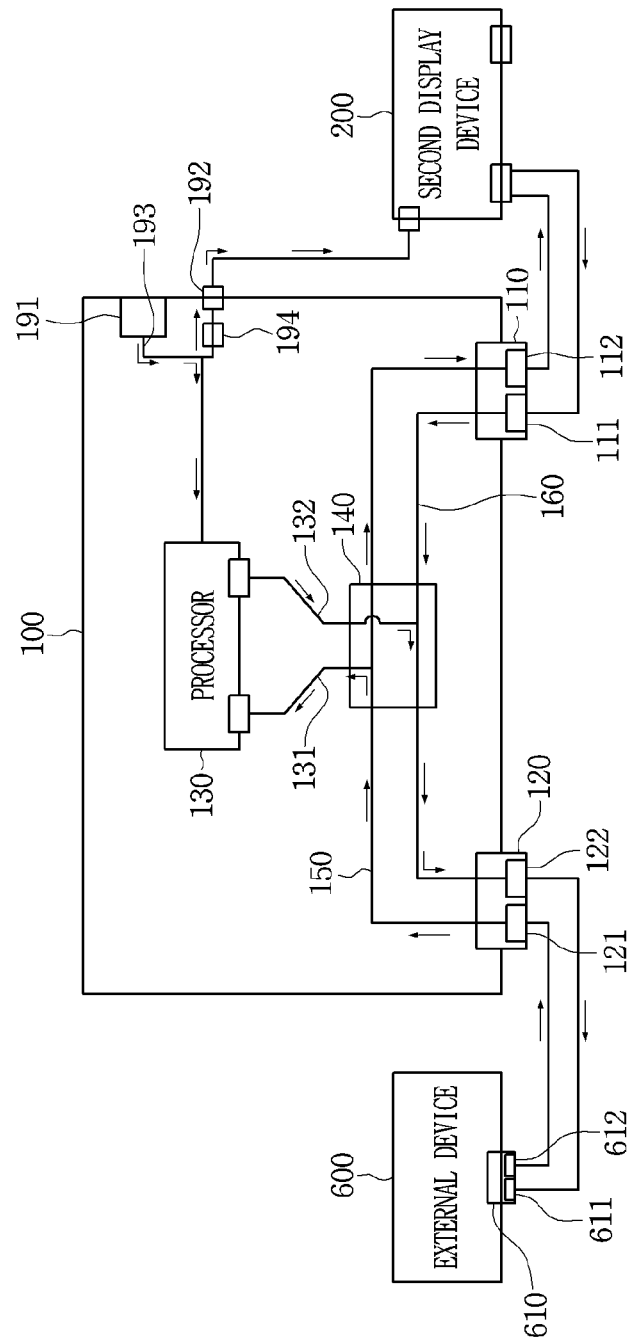

FIG. 13D is a diagram illustrating a state where blocking of a user input transmitted to a second display device is released, and switched connections between the RX line 131 and TX line 132 and the first bus 150 and second bus 160 are again switched, whereby the RX line 131 is connected to the second bus 160 and the TX line 132 is connected to the first bus 150.

According to FIG. 13D, the processor 130 may release blocking of a user input transmitted to the second display device and may again switch connections between the RX line 131 and TX line 132 and the first bus 150 and second bus 160 to connect the TX line 132 to the second bus 160 and to connect the RX line 131 to the first bus 150.

In this manner, after a master/slave setting of the plurality of display devices 100, 200, 300, and 400 configuring the multi-display system 10 is completed, the blocking of the user input may be released, and thus, a single remote controller may integratedly control the plurality of display devices included in the multi-display system 10.

Moreover, connections between the processor and the first bus and second bus which have been switched after a setting of the master/slave is completed may be again switched and aboriginally restored, thereby enabling the external device 600 to control the plurality of display devices 100, 200, 300, and 400 included in the multi-display system 10.

In the present embodiment, the input unit 191 is described as being provided in the first display device 100, but is not limited thereto. In detail, the input unit 191 may be provided outside the first display device 100 and may communicate with a third interface unit (not shown) of the first display device 100 to transmit a user input to the first display device 100.

FIG. 13E is a diagram illustrating a method of periodically switching a connection between the RX line 131 and the first bus 150 and a connection between the TX line 132 and the second bus 160 to periodically transmit a first command to a second display device, a third display device, and a fourth display device in a state where a master/slave is set.

According to FIG. 13E, in a state where the first display device 100 is set to a master and the other display devices 200, 300, and 400 are set to slaves, a connection between the RX line 131 and the first bus 150 and a connection between the TX line 132 and the second bus 160 in the first display device 100 may be periodically switched to periodically connect the RX line 131 to the second bus 160 and connect the TX line 132 to the first bus 150. Also, when the RX line 131 is connected to the second bus 160 and the TX line 132 is connected to the first bus 150, the processor 130 may transmit a first command to the second display device 200.

In this case, the first command may be a command for synchronizing a setting time of each of the second, third, and fourth display devices 200, 300, and 400 with a setting time of the first display device 100. In detail, the processor 130 may periodically transmit a time synchronization command to the second display device 200, thereby performing control so that the setting time of each of the second display device 200, the third display device 300, and the fourth display 400 which are slaves is set to match the setting time of the first display device 100 which is the master.

Figure 14:
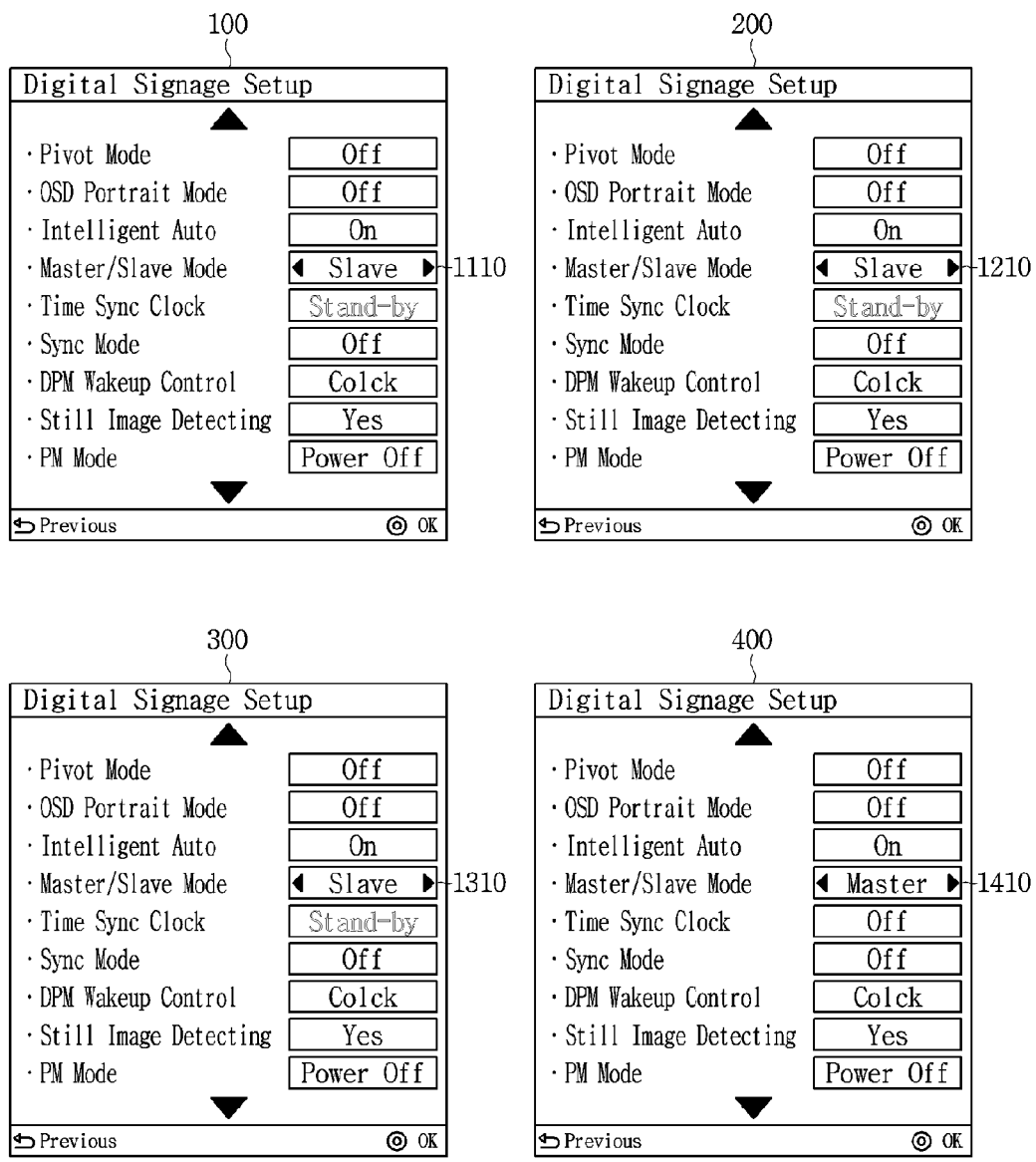
FIG. 14 is a diagram illustrating a user interface (UI) screen for setting a mater/salve displayed on a plurality of display devices 100, 200, 300, and 400 configuring a multi-display system according to an embodiment of the present invention.

FIG. 14 is a diagram illustrating a UI screen for setting a mater/salve displayed on the plurality of display devices 100, 200, 300, and 400 configuring the multi-display system according to an embodiment of the present invention.

According to FIG. 14, when a user input for setting a setting value of each of the plurality of display devices 100, 200, 300, and 400 configuring the multi-display system is received through the user input unit 191, each of the plurality of display devices 100, 200, 300, and 400 configuring the multi-display system may display a UI screen for setting the setting value, and the UI screen may include menus 1110, 1210, 1310, and 1410 for setting a master/slave.

According to FIG. 14, the first display device 100, the second display device 200, and the third display device 300 may be set to the slaves, and the fourth display 400 may be set to the master.

In the plurality of display devices 100, 200, 300, and 400 connected to each other in the daisy chain type, a signal may be transmitted in the order of the second display device 200, the third display device 300, and the fourth display 400 by the first display device 100, and thus, the input unit 191 may be equipped in the first display device 100. Also, when the input unit 191 is provided outside the display device, the first display device 100 may be directly connected to the input unit 191.

Therefore, when there is a user input for setting the master/slave, the first display device 100 may be set to the master, and the second, third, and fourth display devices 200, 300, and 400 may be set to the slaves.

FIG. 15 is a diagram describing a method of blocking a user input transmitted to a second display device according to a first user input, according to an embodiment of the present invention.

A screen of the first display device 100 may include various menus for setting a setting value of the display device 100. The user input transmission line may be connected to the first display device 100, the second display device 200, the third display device 300, and the fourth display 400, and thus, a user may select a menu for setting a setting value of the display device, thereby integratedly setting the setting values of the plurality of display devices.

However, in setting the master/slave, since the first display device 100 should be set to the master and the second, third, and fourth display devices should be set to the slaves, when a first user input is received, the processor 130 of the first display device may control the blocker 194 to block a user input transmitted to the second display device.

The first user input, as illustrated in FIG. 15A, may be a movement of a pointer to a master/slave setting menu 1410. In detail, in a case where the user performs control of the display device by using a pointer remote controller, when a pointer 1150 moves to a master/slave setting menu 1110, the processor 130 of the first display device 100 may control the blocker 194 to block the user input transmitted to the second display device 200. Accordingly, all user inputs transmitted to the second display device 200, the third display device 300, and the fourth display 400 may be blocked.

As illustrated in FIG. 15B, when a highlight 1160 moving a menu moves to the master/slave setting menu 1110 according to an arrow key being input by the user, the processor 130 may control the blocker 194 to block the user input transmitted to the second display device 200.

As illustrated in FIG. 15C, with regard to a user input for displaying a UI 1180 for setting a master/slave, a user input transmitted to the second, third, and fourth display devices 200, 300, and 400 may be blocked. In detail, when a master/slave setting menu 1170 is selected by an input of the user and thus the UI 1180 for setting the master/slave is displayed, the processor 130 may control the blocker 194 to block the user input transmitted to the second display device 200.

Figure 16:
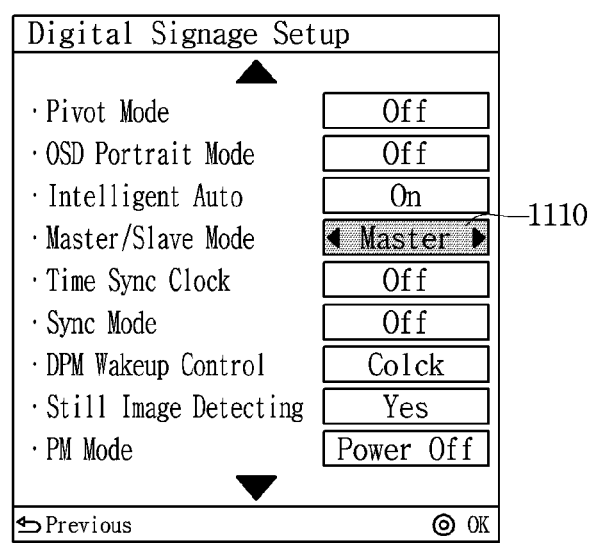
FIG. 16 is a diagram illustrating a screen where a first display device is set to a master by a user input, according to an embodiment of the present invention.

FIG. 16 is a diagram illustrating a screen where a first display device is set to a master by a user input, according to an embodiment of the present invention.

According to FIG. 16, when a second user input for designating the first display device as a master is received, the processor 130 may set the first display device to the master.

Moreover, the processor 130 may switch a connection between the RX line 131 and the first bus 150 and a connection between the TX line 132 and the second bus 160 to connect the RX line 131 to the second bus 160 and to connect the TX line 132 to the first bus 150, and may transmit a command for setting the second display device 200, the third display device 300, and the fourth display 400 to slaves to the second display device 200 by using the first bus 150.

Figure 17:
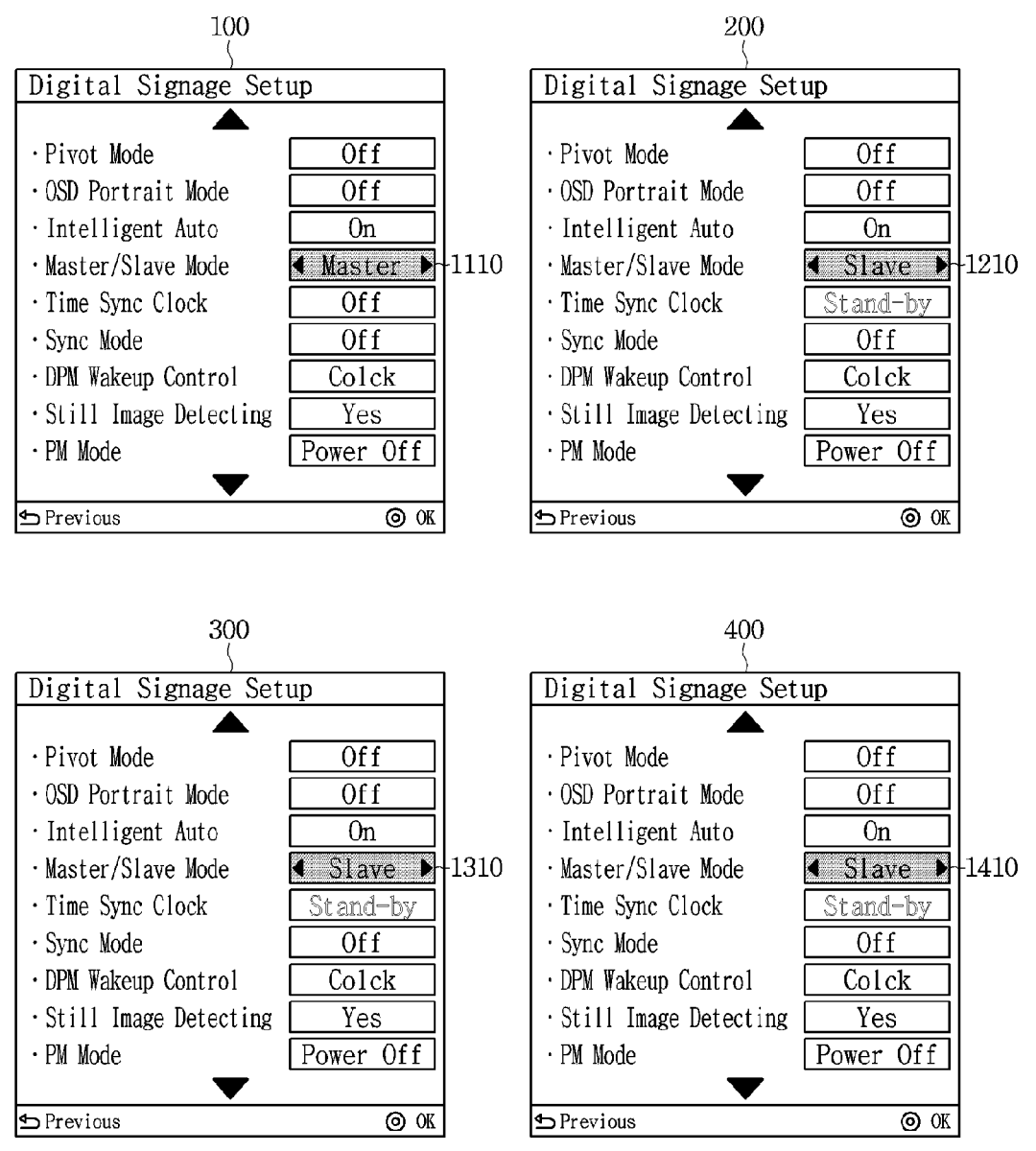

FIG. 17 is a diagram illustrating a UI screen displayed on the plurality of display devices 100, 200, 300, and 400 configuring the multi-display system when a command for setting the second display device, the third display device, and the fourth display to slaves is transmitted.

According to FIG. 17, the first display device 100 is set to a master according to a user input received through the input unit 191, and the second display device 200, the third display device 300, and the fourth display device 400 are set to slaves according to a slave setting command transmitted from the first display device.

Figure 18:
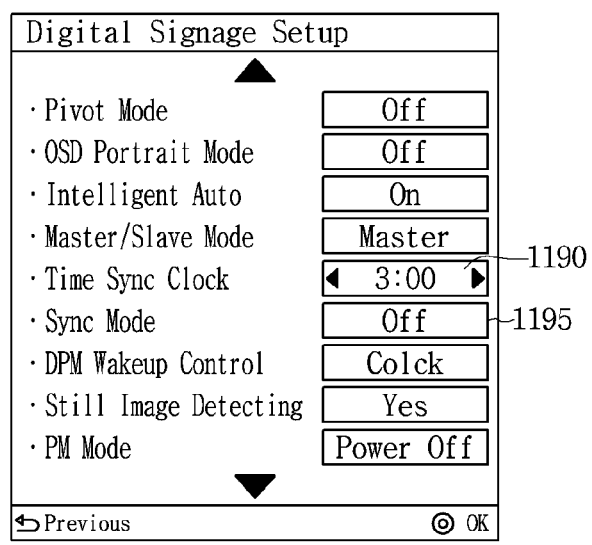
FIG. 18 is a diagram illustrating a method of setting a synchronization period and whether to set time synchronization between a first display device and second, third, and fourth display devices.

FIG. 18 is a diagram illustrating a method of setting a synchronization period and whether to set time synchronization between the first display device and the second, third, and fourth display devices.

As illustrated in FIG. 18, the display unit 180 of the first display device 100 may display a menu 1195 for performing the ON/OFF of synchronization of a plurality of display devices and a menu 1190 for setting a synchronization period.

When a user input for performing the ON of a synchronization mode is received through the input unit 191, the processor 130 may switch connections between the processor 130 and the first bus 150 and second bus 160 to transmit a synchronization command to the second display device 200.

Moreover, when a user input for setting the synchronization period is received through the input unit 191, the processor 130 may switch the connections between the processor 130 and the first bus 150 and second bus 160 at every period input by the user and may transmit the synchronization command to the second display device 200.

In the present embodiment, it is described that the user sets a synchronization period and whether to set synchronization between the plurality of display devices 100, 200, 300, and 400 configuring the multi-display system, but the present embodiment is not limited thereto. For example, the synchronization period and whether to set the synchronization between the plurality of display devices 100, 200, 300, and 400 may be set to a default.

In the present embodiment, all of the second display device 200, the third display device 300, and the fourth display 400 are described as including the same elements, but are not limited thereto. For example, the fourth display device 400 may not include the second interface unit, and the second display device 200, the third display device 300, and the fourth display 400 may not include the switch unit 140, the input unit 191, and the blocker 194.

In the present embodiment, it is described that the first display device 100 is set to the master and the other display devices are set to the slaves by a user input, but the present embodiment is not limited thereto. For example, in a case where the plurality of display devices 100, 200, 300, and 400 are sold as one set, one display device including the input unit 191 may be set to the master, and the other display device including no input unit 191 may be set to the slave. As another example, when the input unit 191 is provided outside the display device, a display device directly connected to the input unit 191 may be set to the master, and a display device indirectly connected to the input unit 191 through another display device may be set to the slave.

Figure 19:
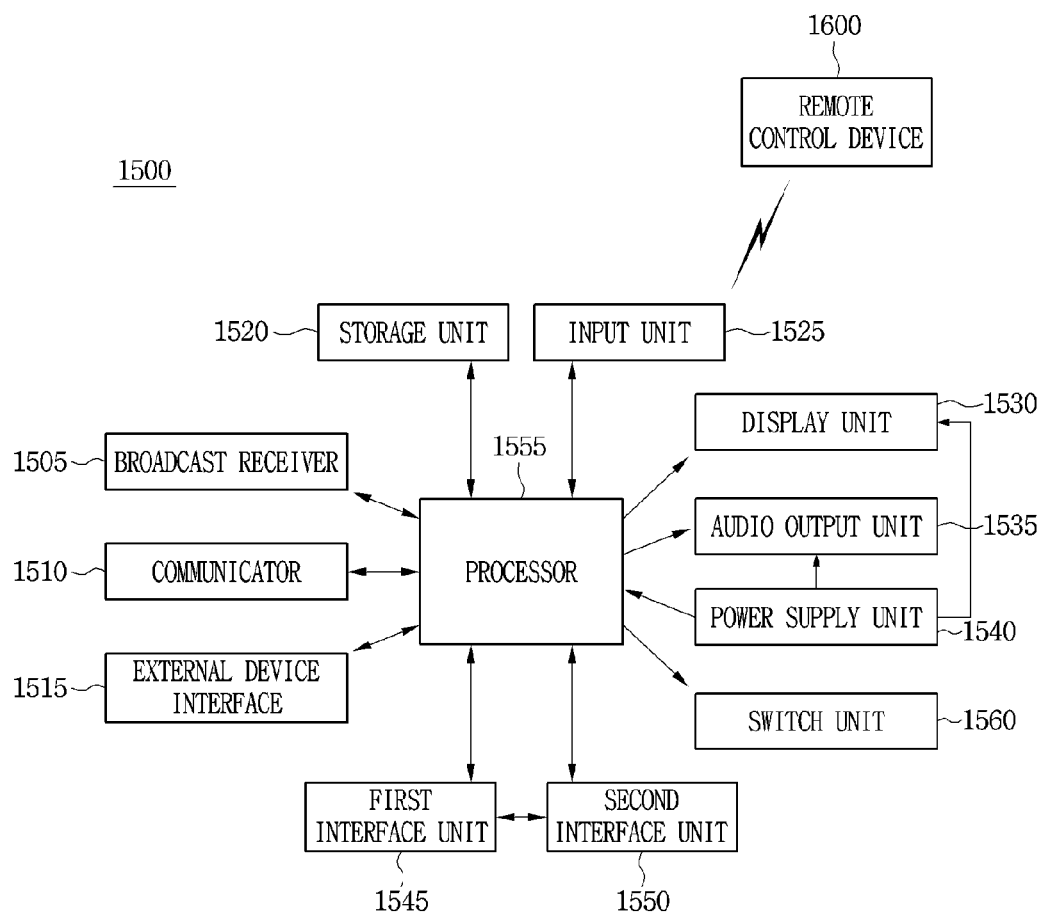
FIG. 19 is a diagram illustrating a block diagram of a display device 1500 configuring a digital signage system when a multi-display system according to an embodiment of the present invention is a digital signage system.

FIG. 19 is a diagram illustrating a block diagram of a display device 1500 configuring a digital signage system when a multi-display system according to an embodiment of the present invention is a digital signage system.

The display system may be a digital signage system. A digital signage may be used as a common meaning for a display advertisement billboard which transfers information and advertisements and is based on a composite combination of various IT technologies such as hardware, software, contents, network, etc. The digital signage may be installed and operated in large buildings, having a large floating population, such as terminals, public offices, bus stations, department stores, subway, airports, hotels, hospitals, etc., and places, at which persons stay for a certain time, such as business establishments, elevators, theaters, restaurants, shopping malls, shops, etc.

Furthermore, in a stand-alone digital signage which is a type of digital signage, a signboard or a billboard may be configured with a digital information display such as a plasma display panel (PDP), a liquid crystal display (LCD), or a light emitting diode (LED), and pre-created information and advertisement content may be stored in a storage unit and may be reproduced. In a networked digital signage which is another type of digital signage, information and advertisement content may be transmitted to a digital information display over a communication network, and a center may perform transmission of content and state management of a device.

Such a digital signage may be an intelligent network television (TV) capable of supporting one or more of, for example, a broadcast receiving function, a computer supporting function, and an Internet function and may include various interfaces such as handwriting type input devices, touch screens, or space remote controllers. Such display devices are capable of supporting a wired or wireless network, and thus, may perform a function such as e-mail, Web-browsing, banking, or gaming in connection with the Internet or/and other digital devices. The display devices may use a general-purpose OS which is standardized for the above-described functions or support. Therefore, the display devices may freely add or delete various applications to or from a general-purpose OS kernel, and thus, may perform a user-friendly function.

According to FIG. 18, the display device 1500 configuring a digital signage system according to another embodiment of the present invention may include a broadcast receiver 1505, a communicator 1510, an external device interface 1515, a storage unit 1520, an input unit 1525, a display unit 1530, an audio output unit 1535, a power supply unit 1540, a first interface unit 1545, a second interface unit 1550, a processor 1555, a switch unit 1560, and a remote control device 1600.

Here, the elements illustrated in FIG. 18 are merely an embodiment for describing the present invention, and depending on the requirement of those skilled in the art, some elements may be deleted or added, or a plurality of elements may be integrated into one module. Accordingly, such elements are within the spirit and scope of the present invention.

The broadcast receiver 1505 may denote an element of a general digital broadcast receiver including a tuner, a demodulator, etc.

The tuner (not shown) may select a specific broadcast channel according to a channel selection command and may receive a broadcast signal of the selected specific broadcast channel.

The demodulator (not shown) may separate the received broadcast signal into a video signal, an audio signal, and a data signal associated with a broadcast program, and may restore the separated video signal, audio signal, and data signal to an output-enabled form.

The communicator 1510 may include an Ethernet terminal for a wired network and wireless LAN (WLAN) (Wi-Fi), wireless broadband (Wibro), world interoperability for microwave access (Wimax), and high speed downlink packet (HSDPA) communication standards for a wireless network and may transmit or receive data by using the Ethernet terminal and communication standards. Also, the communicator 1510 may select and receive a desired application from among applications opened to the public over a network.

Moreover, the communicator 1510 may transmit or receive data to or from the other user or the other electronic device over a connected network or another network linked to the connected network.

Moreover, the communicator 1510 may access a certain webpage over the connected network or the other network linked to the connected network. That is, the communicator 1510 may access the certain webpage over a network to transmit or receive data to or from a corresponding server.

Moreover, the display device 1500 configuring the digital signage system may be connected to the server through the communicator 1510 to receive and output content.

Furthermore, the communicator 1510 may receive content or pieces of data provided from a content provider or a network operator. That is, the communicator 1510 may receive content, such as movie, advertisement, game, VOD, or a broadcast signal provided from the content provider or the network operator, and information relevant thereto over the network.

Moreover, the communicator 1510 may receive update information and an update file of firmware provided from the network operator and may transmit the pieces of data to the Internet, the content provider, or the network operator.

The communicator 1510 may select and receive a desired application from among applications opened to the public over the network.

The external device interface 1515 may connect an external device and the digital signage 1500. A display device may be connected to an external device, such as a digital versatile disc (DVD), a blue-ray disc player, a game machine, a camera, a camcorder, a PC, a tablet PC, or a smartphone, by wire or wirelessly through the external device interface 1515. Also, the external device interface 1515 may receive an application or an application list of an adjacent external device and may transfer the received application or application list to the processor 1555 or the storage unit 1520.

The storage unit 1520 may store content, metadata of the content, etc. received from the server or a mobile device. Also, the storage unit 1520 may temporarily store an audio, a video, and a data signal received through the external device interface 1515 or the communicator 1510. Furthermore, the storage unit 1520 may receive and store the application or the application list input through the external device interface 1515 or the communicator 1510. The storage unit 1520 may be implemented with electrically erasable programmable read-only memory (EEPROM) or the like.

The input unit 1525 may transfer a signal, input by a user, to the processor 1555 or may transfer a signal of the processor 1555 to the user. For example, the input unit 1525 may receive and process a control signal, such as power ON/OFF, a channel selection, or a screen setting, from the remote control device 1600 or may perform processing to a control signal of the processor 1555 to the remote control device 1600, according to various communication schemes such as a radio frequency (RF) communication scheme, and infrared (IR) communication scheme, etc.

The display unit 1530 may convert an image signal, a data signal, or an OSD signal processed by a controller 2054 or an image signal or a data signal received from an external device interface 2030 into R, G, and B signals to generate a driving signal. A display unit 2060 may be a PDP, an LCD, an OLED, a flexible display, or a three-dimensional (3D) display.

Moreover, the display unit 1530 may display an UI screen for setting a setting value of the digital signage 1500 according to control by the processor 1555. Also, when state information about a plurality of digital signage configuring a multi-display system are received through the second interface unit 1550, the display unit 1530 may display the received state information according to control by the processor 1555.

The audio output unit 1535 may receive a signal (for example, a stereo signal, a 3.1 channel signal, a 5.1 channel signal, or a 6 channel) voice-processed by the processor 1555 to output a voice.

The power supply unit 1540 may supply power necessary for each element of the display device 1500 configuring the digital signage. For example, the power supply unit 1540 may supply the power to the processor 1555 capable of being implemented as a system on chip (SOC) type, the display unit 1530 for displaying an image, and the audio output unit 1535 for outputting an audio.

The remote control device 1600 may transmit a user input to the input unit 1525. To this end, a remote controller 2100 may use, for example, Bluetooth, radio frequency (RF) communication, infrared (IR) communication, ultra-wideband (UWB), ZigBee, RS-232, RS-485 schemes, etc.

The processor 1555 may control the display unit 1530 to image-process an image signal and display an image corresponding to the image signal. Also, the image signal image-processed by the processor 1555 may be transmitted to an external output device through the external device interface 1515.

A voice signal processed by the processor 1555 may be audio-output to the audio output unit 1535. Also, the voice signal processed by the processor 1555 may be input the external output device through the external device interface 1515.

In addition, the processor 1555 may control an overall operation of the display device 1500 configuring the digital signage.

Moreover, the processor 1555 may control the display device 1500 according to a user command input through the input unit 1525 or an internal program and may access a network to enable a user to download a desired application or application list into the display device 1500.

Moreover, when an image or a voice of a channel selected by the user is received through the broadcast receiver 1505, the processor 1555 may allow the received image or voice to be output through the display unit 180 or the audio output unit 185.

Moreover, the processor 1555 may allow an image signal or a voice signal, input from an external device (for example, a camera or a camcorder) through the external device interface 1515, to be output through the display unit 1530 or the audio output unit 1535 according to an external device image reproduction command received through the input unit 1525.

The processor 1555 may control the display unit 180 to display an image, and for example, may perform control in order for the display unit 1530 to display a broadcast image input through the broadcast receiver 1505, an external input image input through the external device interface 1515, an image input through the communicator 1510, or an image stored in the storage 1520. In this case, the image displayed on the display unit 1530 may be a still image or a moving image and may be a 2D image or a 3D image.

Moreover, the processor 1555 may perform control to reproduce content stored in the display device 1500, received broadcast content, or external input content input from the outside, and the content may be various types such as a broadcast image, an external input image, an audio file, a still image, an accessed Web screen, and a document file.

The input unit 1525, the display unit 1530, the first interface unit 1545, the second interface unit 1550, the processor 1555, and the switch unit 1560 may perform all functions of the input unit 191, the display unit 180, the first interface unit 150, the second interface unit 160, the processor 130, and the switch unit 140 described above with reference to FIGS. 2 to 14.

The processor 130 (1555) may be an element that performs control of a device generally, and may be referred to as a central processing unit, a microprocessor, or a controller.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. This description is intended to be illustrative, and not to limit the scope of the claims. Many alternatives, modifications, and variations will be apparent to those skilled in the art.

The invention claimed is:

1. A device configuring a multi-display system, the device comprising:
   a first interface configured to provide an access path for access to another device;
   a second interface configured to be connected to the first interface through a first bus and a second bus;
   a processor configured to transmit a first command and receive a second command;
   a TX line connecting the processor to one of the first bus or the second bus to transfer the first command;
   an RX line connecting the processor to one of the first bus or the second bus to transfer the second command; and
   a switch unit connecting the RX line and one of the first bus or the second bus, or connecting the TX line and one of the first bus or the second bus,
   wherein the processor controls the switch unit to respectively connect the RX line to the first bus and the TX line to the second bus or to respectively connect the RX line to the second bus and the TX line to the first bus,
   wherein the first interface is configured to communicate with a second device,
   wherein the second interface is configured to communicate with an external device,
   wherein, in a state where the RX line is connected to the first bus and the TX line is connected to the second bus, the first bus transfers a command, transmitted from the external device, to the second device and the RX line, and
   wherein, in a state where the RX line is connected to the second bus and the TX line is connected to the first bus, the processor transmits the first command generated by the processor to the second device by using the first bus.

2. The device of claim 1, wherein
   in the state where the RX line is connected to the second bus and the TX line is connected to the first bus, the processor receives the second command through the second bus, and
   the second command is a command transmitted from the second device.

3. The device of claim 2, wherein the processor periodically connects the RX line to the second bus and the TX line to the first bus to periodically transmit the first command to the second display device by using the first bus.

4. The device of claim 2, wherein the first command is a command for synchronizing a time of the second device with a time of the device.

5. The device of claim 4, further comprising a hardware communicator configured to communicate with a server,
wherein the processor sets the time of the device by using time information received from the server.

6. The device of claim 1, wherein
in the state where the RX line is connected to the first bus and the TX line is connected to the second bus, the second bus transfers a command transmitted from the second display device or a command generated by the processor to the second interface.

7. The device of claim 1, further comprising:
a hardware input unit configured to receive a user input; and
a transmitter configured to transmit the received user input to a second device;
wherein:
the processor is further configured to cause the transmitted user input to be blocked according to a first user input being received,
when a second user input for designating the device to a master is received, the processor sets the device to the master, connects the RX line to the second bus, connects the TX line to the first bus and transmits the first command to the second display device by using the first bus,
when the first command is transmitted, the processor causes the blocked transmitted user input to be released, connects the RX line to the first bus and connects the TX line to the second bus, and
the first command is a command for setting the second display device to a slave.

8. The device of claim 1, wherein the second interface and the first interface are configured to respectively communicate with an external device and a second display device by using an RS-232C communication protocol.

9. The device of claim 1, wherein the device is a display device which further includes a display unit displaying an image.

10. A command transmission method of a device configuring a multi-display system, the device comprising:
a first interface configured to provide an access path for access to a second device;
a second interface configured to be connected to the first interface through a first bus and a second bus and communicate with an external device;
a processor configured to transmit a first command and receive a second command;
a TX line connecting the processor to one of the first bus or the second bus to transfer the first command; and
an RX line connecting the processor to one of the first bus or the second bus to transfer the second command, and
the command transmission method comprising:
connecting the RX line to the first bus and the TX line to the second bus; and
switching a connection between the RX line and the first bus and a connection between the TX line and the second bus to connect the RX line to the second bus and the TX line to the first bus,
wherein the connecting the RX line to the first bus and the TX line to the second bus comprises:
in a state where the RX line is connected to the first bus and the TX line is connected to the second bus, transferring a command, transmitted from the external device, to the second device and the processor through the first bus,
wherein the switching a connection between the RX line and the first bus and a connection between the TX line and the second bus comprises:
in a state where the RX line is connected to the second bus and the TX line is connected to the first bus, transmitting the first command generated by the processor to the second device by using the first bus.

11. The command transmission method of claim 10, wherein
the command transmission method further comprises:
in a state where the RX line is connected to the second bus and the TX line is connected to the first bus,
receiving the second command through the second bus, wherein the second command is a command transmitted from the second device.

12. The command transmission method of claim 11, wherein the switching the connection comprises periodically connecting the RX line to the second bus and the TX line to the first bus to periodically transmit the first command to the second display device by using the first bus.

13. The command transmission method of claim 10, further comprising switching a connection between the RX line and the second bus and a connection between the TX line and the first bus to connect the RX line to the first bus and the TX line to the second bus.

14. The command transmission method of claim 10, wherein
the connecting the RX line to the first bus and the TX line to the second bus comprises:
transferring a command transmitted from the second display device or a command generated by the processor to the second interface through the second bus.

15. The command transmission method of claim 10, further comprising:
receiving a user input and transmitting the received user input to a second device;
blocking the transmitted user input according to a first user input being received,
when a second user input for designating the device to a master is received, setting the device to the master;
connecting the RX line to the second bus and the TX line to the first bus, and transmitting the first command to the second display device by using the first bus;
releasing the blocking of the transmitted user input; and
connecting the RX line to the first bus and the TX line to the second bus, and
wherein the first command is a command for setting the second display device to a slave.

* * * * *